(12) United States Patent
Urakabe et al.

(10) Patent No.: US 7,327,095 B2
(45) Date of Patent: Feb. 5, 2008

(54) DISCHARGE LAMP LIGHTING APPARATUS

(75) Inventors: Takahiro Urakabe, Tokyo (JP); Akihiko Iwata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1780 days.

(21) Appl. No.: 09/729,089

(22) Filed: Dec. 5, 2000

(65) Prior Publication Data

US 2006/0061299 A1 Mar. 23, 2006

(30) Foreign Application Priority Data

May 24, 2000 (JP) .................... P. 2000-153072

(51) Int. Cl.
*G05F 1/00* (2006.01)

(52) U.S. Cl. .................... 315/291; 315/209 R

(58) Field of Classification Search ............ 315/209 R, 315/219, 220, 224, 225, 226, 291, 307, 308, 315/DIG. 7

See application file for complete search history.

(56) References Cited

U.S. PATENT DOCUMENTS

| | | | |
|---|---|---|---|
| 5,384,518 A | | 1/1995 | Kido et al. |
| 5,416,387 A | | 5/1995 | Cuk et al. |
| 5,434,474 A | * | 7/1995 | Ukita et al. .................. 315/128 |
| 5,568,017 A | | 10/1996 | Albou |
| 5,751,121 A | | 5/1998 | Toyama et al. |
| 5,914,566 A | * | 6/1999 | Matsumoto et al. .......... 315/82 |
| 6,081,439 A | * | 6/2000 | Kijima ........................ 363/97 |
| 6,294,879 B1 | * | 9/2001 | Nagase et al. .......... 315/209 R |

FOREIGN PATENT DOCUMENTS

| | | |
|---|---|---|
| JP | 7-194142 | 7/1995 |
| JP | 8-64374 | 3/1996 |
| JP | 8-195288 | 7/1996 |
| JP | 9-129385 | 5/1997 |
| JP | 9-139291 | 5/1997 |
| JP | 9-167693 | 6/1997 |
| JP | 10-326682 | 12/1998 |
| JP | 11-233279 | 8/1999 |
| JP | 11-307283 | 11/1999 |
| JP | 2000-82592 | 3/2000 |

OTHER PUBLICATIONS

Reatti, A.; "Low-Cost High Power-Density Electronic Ballast for Automotive HID Lamp", *IEEE Transactions on Power Electronics*, vol. 13, No. 2, pp. 361-368 (Mar. 2000).

* cited by examiner

*Primary Examiner*—Trinh Dinh
*Assistant Examiner*—Dieu Hien T Duong
(74) *Attorney, Agent, or Firm*—Leydig, Voit & Mayer, Ltd.

(57) ABSTRACT

A discharge lamp lighting apparatus includes a DC-DC converter for outputting voltages having respective different potentials from two wirings, a switching circuit having input terminals connected to the two wirings, an output terminal connected to one electrode of a discharge lamp, and a capacitor having one electrode terminal connected to a second electrode of the discharge lamp and a second electrode terminal connected to one of the two wirings of the DC-DC converter. The switching circuit includes a switching element for controlling connections between one of the two wirings and the output terminal. The other wiring is connected to the output terminal.

8 Claims, 18 Drawing Sheets

DISCHARGE LAMP LIGHTING APPARATUS

BACKGROUND OF THE INVENTION

This invention relates to a discharge lamp lighting apparatus used for an automobile or as a light source of a projection display.

FIG. 18 is a circuit configuration diagram showing a conventional discharge lamp lighting apparatus disclosed in the Unexamined Japanese Patent Application Publication No. Hei 12-82592. In the drawing, numeral 1 is a direct current power source such as a battery, and numeral 2 is a DC-DC converter for regulating and outputting electric power supplied from the direct current power source 1 and in the DC-DC converter 2, numeral 2a is a transformer and numeral 2b is an FET (Field Effect Transistor) and numeral 2c is a diode. Numeral 3 is a ground, and numeral 4 is a shunt resistor for detection of a discharge lamp current $I_L$, and numeral 50 is a full bridge circuit (hereinafter called "H bridge") including of FETs 50a to 50d connected in an H shape and converting direct current electric power regulated by the DC-DC converter 2 into alternating current electric power, and numeral 6 is a discharge lamp driven by the alternating current electric power converted by the H bridge 50.

Also, numeral 7 is an interface (thereinafter called "I/F") which receives a discharge lamp voltage $V_L$ from the side of a cathode of output of the DC-DC converter 2 and also receives the discharge lamp current $I_L$ from the side of the H bridge 50 of the shunt resistor 4, and numeral 8 is a microcomputer for controlling the FET 2b of the DC-DC converter 2 so that electric power supplied to the discharge lamp 6 based on the discharge lamp voltage $V_L$, the discharge lamp current $I_L$ and a preset circuit impedance fixed value sequentially detected through the I/F 7 is brought to a predetermined value.

Next, operations will be described. In the case of starting to light the discharge lamp 6, the electric power supplied from the direct current power source 1 is regulated and outputted by the DC-DC converter 2 and further the DC electric power is converted into AC electric power by the H bridge 50 to drive the discharge lamp 6. Here, the discharge lamp voltage $V_L$ detected from the side of the cathode of the output of the DC-DC converter 2 is increased to −400 V as shown in FIG. 19 and is further increased to about 20 kV in the peak and then the discharge lamp 6 lights and thereafter reaches a stable state of lighting at −90 V. Such control is performed by controlling the FET 2b of the DC-DC converter 2 so that the electric power supplied to the discharge lamp 6 based on the discharge lamp voltage $V_L$ and the discharge lamp current $I_L$ sequentially detected through the I/F 7 is brought to the predetermined value by means of the microcomputer 8.

After discharge lamp 6 lights, an AC voltage is applied to the discharge lamp 6 by repeating the switch state with the FETs 50a and 50d of the H bridge 50 turned on and the FETs 50b and 50c turned off and the switch state with the FETs 50a and 50d turned off and the FETs 50b and 50c turned on.

By the way, it is desirable that the discharge lamp electric power supplied to the discharge lamp 6 in the stable state of lighting be 34 W. However, in case of merely controlling the electric power supplied to the discharge lamp 6 based on the discharge lamp voltage $V_L$ and the discharge lamp current $I_L$ at 34 W by the microcomputer 8, there is a loss due to a voltage drop due to the ON resistance of the FETs 50a to 50d of the H bridge 50, so that the electric power supplied to the discharge lamp 6 actually becomes lower than 34 W. Thus, the circuit impedance fixed value is set previously in expectation of the drop due to the ON resistance of the FETs 50a to 50d of the H bridge 50 and on the basis of the discharge lamp voltage $V_L$, the discharge lamp current $I_L$ and the preset circuit impedance fixed value by the microcomputer 8, and controlled so that the electric power supplied to the discharge lamp 6 is 34 W even when there is the power loss due to the drop by ON resistance of the FETs 50a to 50d of the H bridge 50.

The conventional discharge lamp lighting apparatus is configured as described above and a high voltage of a maximum of 400 V is applied to the H bridge 50, so that the FETs of the H bridge 50 need to have high withstand voltages capable of withstanding 400 V. Such FETs having high withstand voltages are high in unit price and also four FETs with such a high unit price are used in the conventional configuration. Therefore, a configuration of an inverter circuit with the H bridge as described has an adverse effect in achieving miniaturization and cost reduction. A reduction in the number of FET elements of the H bridge 50 and a decrease in the voltage applied to the H bridge are problems of the discharge lamp lighting apparatus to be solved.

SUMMARY OF THE INVENTION

The invention is implemented to solve such problems, and it is an object of the invention to achieve miniaturization and cost reduction by performing a reduction in the number of elements constructing discharge lamp drive means (inverter circuit portion) for converting a direct current voltage into an alternating current voltage to drive a discharge lamp or a decrease in the voltage applied to the discharge lamp drive means.

A discharge lamp lighting apparatus according to a first configuration of the invention comprises electric power regulating means for regulating electric power supplied from a power source and outputting voltages having respective different potentials from two wirings, a switching circuit part formed of one switching element in which input terminals are connected to the two wirings of the electric power regulating means and also one input terminal of the input terminals is connected to one electrode of a discharge lamp and an output terminal is connected to the other electrode of the discharge lamp, and a capacitor connected in series with the discharge lamp in a circuit for making connections of one input terminal of the switching circuit part, the discharge lamp and the output terminal of the switching circuit part.

Also, with a discharge lamp lighting apparatus according to a second configuration of the invention, in the first configuration, the discharge lamp is driven with alternating current by repeating a process of supplying a current from the electric power regulating means to the discharge lamp and performing charge to the capacitor and a process of stopping actuation of the electric power regulating means and supplying a reverse directional current from the capacitor to the discharge lamp.

Also, with a discharge lamp lighting apparatus according to a third configuration of the invention, in the first or second configuration, a standby period for making preparations for lighting, an electrode heating period for detecting at least a voltage $V_C$ of the capacitor to heat the electrodes of the discharge lamp by a discharge lamp current until the voltage $V_C$ reaches a predetermined voltage after the discharge lamp is lighted, and an AC discharge period for passing an AC current through the discharge lamp to sustain discharge are provided.

Also, with a discharge lamp lighting apparatus according to a fourth configuration of the invention, in one of the first to third configurations, one input terminal of the switching circuit part is connected to the output terminal through the switching element and the other input terminal of the switching circuit part is directly connected to the output terminal.

Also, with a discharge lamp lighting apparatus according to a fifth configuration of the invention, in one of the first to fourth configurations, the switching element comprises means for regulating a control voltage so that a discharge lamp current becomes a predetermined value.

Also, with a discharge lamp lighting apparatus according to a sixth configuration of the invention, in one of the first to fifth configurations, voltage smoothing and initial current supply means for smoothing a voltage outputted by the electric power regulating means and supplying a current to the discharge lamp at the time of discharge start is provided.

Also, with a discharge lamp lighting apparatus according to a seventh configuration of the invention, in the sixth configuration, a dead period overlaying a period of stopping actuation of the electric power regulating means on an OFF period of the switching element is provided when performing AC drive of the discharge lamp.

Also, with a discharge lamp lighting apparatus according to an eighth configuration of the invention, in the sixth configuration, the voltage smoothing and initial current supply means is formed by placing a second capacitor in parallel with a circuit in which a parallel circuit of a resistor and a diode is connected in series with a first capacitor.

Also, a discharge lamp lighting apparatus according to a ninth configuration of the invention comprises electric power regulating means for regulating electric power supplied from a power source and outputting positive and negative binary voltages from two wirings, and a switching circuit part formed of first and second switching elements for controlling connections between the two wirings of the electric power regulating means and one electrode of a discharge lamp, and it is constructed so that the other electrode of the discharge lamp becomes a center voltage level of the positive and negative binary voltages.

Also, with a discharge lamp lighting apparatus according to a tenth configuration of the invention, in the ninth configuration, a third switching element is placed between one wiring of the two wirings of the electric power regulating means and the switching circuit part, and the third switching element is made in the OFF state during a standby period for making preparations for lighting.

Also, with a discharge lamp lighting apparatus according to an eleventh configuration of the invention, in the ninth configuration, the electric power regulating means has three terminals for outputting a positive voltage, a ground voltage and a negative voltage, and a voltage clamping element is connected between a ground terminal for outputting the ground voltage and a voltage terminal for outputting the positive or negative voltage.

Also, with a discharge lamp lighting apparatus according to a twelfth configuration of the invention, in the eleventh configuration, three voltage levels consisting of the positive voltage, the ground voltage and the negative voltage are formed by using two transformers.

Also, with a discharge lamp lighting apparatus according to a thirteenth configuration of the invention, in the eleventh configuration, three voltage levels consisting of the positive voltage, the ground voltage and the negative voltage are formed by using an integral transformer in which a primary winding and a secondary winding are placed in one end of a core and another primary winding and a tertiary winding are placed in the other end.

Also, a discharge lamp lighting apparatus according to a fourteenth configuration of the invention comprises electric power regulating means for regulating electric power supplied from a power source and outputting voltages having respective different potentials from four wirings, a switching circuit part formed of four switching elements for controlling connections between the two wirings of the four wirings of the electric power regulating means and electrodes of a discharge lamp, and a capacitor which is connected between output terminals of the switching circuit part and supplies a current to the discharge lamp at the time of discharge start, and the residual two wirings of the four wirings of the electric power regulating means are connected to respective electrodes of the capacitor and the four switching elements are made in the OFF state during a standby period for making preparations for lighting.

Also, with a discharge lamp lighting apparatus according to a fifteenth configuration of the invention, in one of the first to fourteenth configurations, the discharge lamp has an igniter circuit.

DETAILED DESCRIPTION OF THE PREFERRED EMBODIMENTS

First Embodiment

A first embodiment will be described below using the accompanying drawings.

Figure 1:
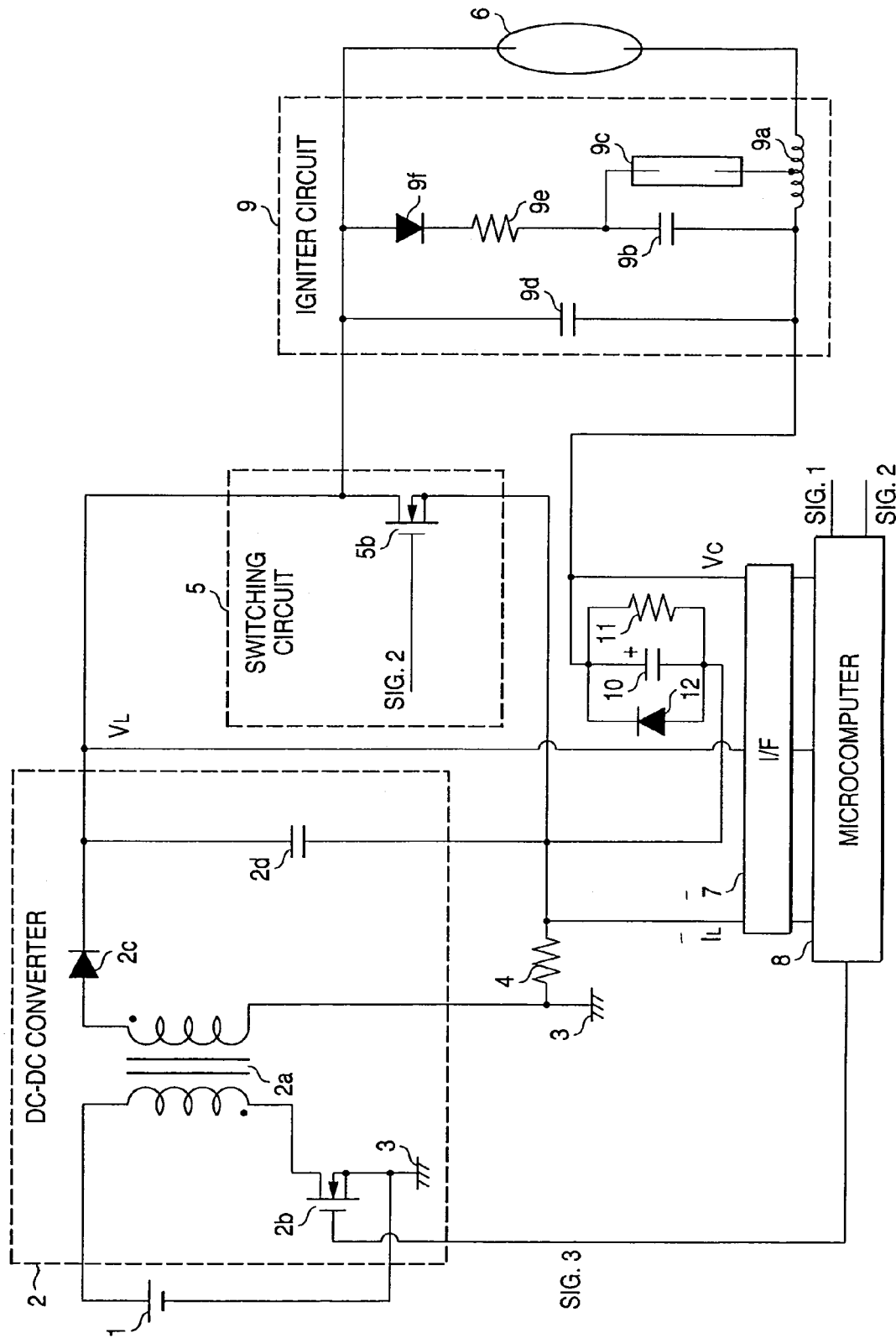
FIG. 1 is a circuit configuration diagram showing a discharge lamp lighting apparatus according to a first embodiment of the invention.

FIG. 1 is a circuit configuration diagram showing a discharge lamp lighting apparatus according to the first embodiment of the invention. In FIG. 1, numeral 1 is a direct current power source such as a battery, and numeral 2 is a DC-DC converter (electric power regulating means) for regulating and outputting electric power supplied from the direct current power source 1, and the DC-DC converter 2 comprises a transformer 2a, an FET 2b, a diode 2c and a capacitor 2d. The capacitor 2d has functions of flowing a current into a discharge lamp at the time of starting an electric discharge and smoothing an output voltage (voltage smoothing and initial current supply means). Numeral 3 is a ground, and numeral 4 is a shunt resistor for detection of a discharge lamp current $I_L$, and numeral 5 is a switching circuit and in the switching circuit 5, input terminals of the switching circuit are connected to two wirings of the DC-DC converter and one input terminal is connected to an output terminal through a switching element (FET) 5b and the other input terminal is directly connected to the output terminal and the output terminal is connected to one electrode of a discharge lamp 6. Numeral 7 is an I/F, and numeral 8 is a microcomputer. Numeral 9 is an igniter circuit having a function of applying a high voltage of the order of 20 kV to the discharge lamp at the time of starting the discharge, and the igniter circuit 9 comprises a pulse transformer 9a with a winding ratio of 1:100, a capacitor 9b for storing energy of discharge starting, a gap switch 9c for conduction with 400 V, a 10 kΩ resistor 9e for determining time from switch on to discharge starting, a diode 9f for reverse flow prevention, and a capacitor 9d for flowing a high peak and short pulse current into the discharge lamp 6 at the time of the discharge starting. Numeral 10 is a capacitor of electrolytic type with a sufficiently large capacity and the capacitor 10 is a capacitor for DC pulse to AC pulse conversion for converting a DC pulse voltage into an AC voltage pulse between electrodes of the discharge lamp 6. The capacitor 10 is placed in series with the discharge lamp 6 in a circuit for connecting one input terminal (input terminal of the side of the FET 5b) of the switching circuit 5 to the igniter circuit 9. Also, the capacitor 10 is connected in parallel with a diode 12 constructed so that a reverse polarity voltage is not applied to the capacitor 10 and a 10 kΩ to 1 MΩ resistor 11 for protection.

Next, connections of each the circuit element will be described.

In FIG. 1, the plus side of the DC power source 1 is connected to the winding end side of a primary winding of the transformer 2a and the winding start side of the primary winding is connected to a drain of the FET 2b. The ground 3 is connected to a source of the FET 2b and the minus side of the DC power source 1. A signal Sig.3 from the microcomputer 8 is inputted to a gate of the FET 2b. The winding start side of a secondary winding of the transformer 2a is connected to an anode of the diode 2c and the winding end side is connected to the ground 3. A cathode of the diode 2c is connected to one electrode of the capacitor 2d and the other input terminal of the switching circuit 5. The other input terminal of the switching circuit 5 is directly connected to the output terminal and also is connected to a drain of the FET 5b and further a source of the FET 5b is connected to the ground 3 through the shunt resistor 4. A signal Sig.2 from the microcomputer is inputted to a gate of the FET 5b. The output terminal of the switching circuit 5 is connected to one electrode of the discharge lamp 6 and is further connected to anodes of the capacitor 9d and the diode 9f of the igniter circuit 9. A cathode of the diode 9f is connected to one electrodes of the capacitor 9b and the gap switch 9c through the resistor 9e. The other electrode of the gap switch 9c is connected to the other electrodes of the capacitors 9b and 9d through a primary winding of the pulse transformer 9a and is further connected to the other electrode of the discharge lamp 6 through a secondary winding of the pulse transformer 9a. An anode of the capacitor 10, the resistor 11 and a cathode of the diode 12 are connected to the capacitors 9b, 9d and the primary winding of the pulse transformer 9a, and a cathode of the capacitor 10, the other electrode of the resistor 11 and an anode of the diode 12 are connected to the ground 3 through the shunt resistor 4.

Also, a voltage $V_L$ of the other input terminal (input terminal directly connected to the output terminal) of the switching circuit 5, a discharge lamp current $I_L$ detected from the shunt resistor 4 and a voltage $V_C$ of the capacitor 10 for DC pulse to AC pulse conversion are inputted to the microcomputer 8 through the I/F 7. The FETs 2b and 5b are controlled by the control signals Sig.2 and Sig.3 according to a preset value within the microcomputer 8.

Then, operations will be described.

Figure 2:
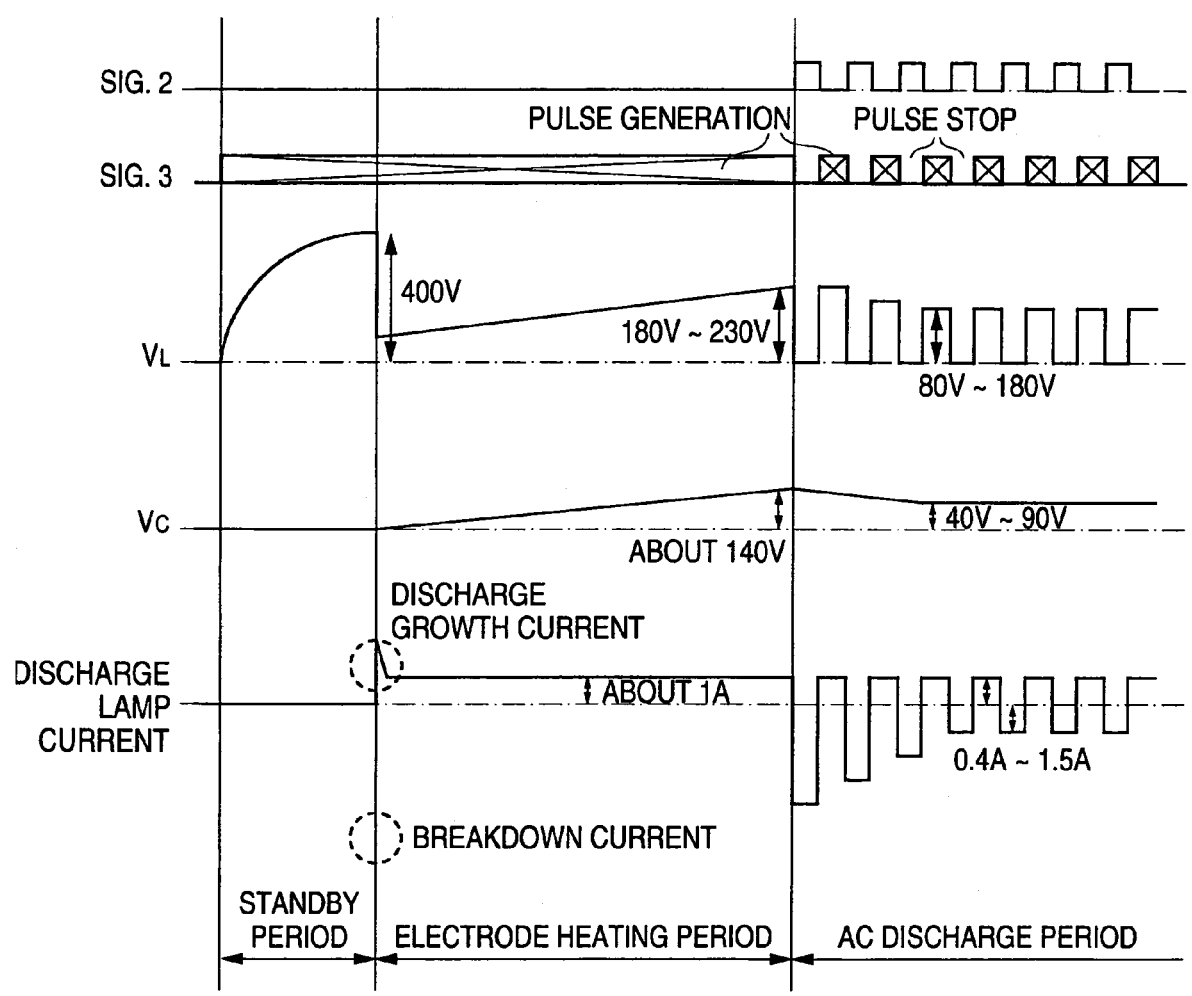
FIG. 2 is a waveform chart showing a signal waveform, a voltage waveform and a discharge lamp current waveform of the discharge lamp lighting apparatus according to the first embodiment of the invention.

FIG. 2 is a timing chart showing input signals of the control signals Sig.2, Sig.3 and output waveforms of the voltages $V_L$, $V_C$ and the discharge lamp current. First, when a switch of the power source 1 is turned on, a pulse signal is generated in the signal Sig.3 and thereby, the DC-DC converter 2 operates, and the signal Sig.2 becomes low and thereby, the FET 5b is turned off. The Sig.3 is a pulse signal with 100 kHz and the pulse signal is controlled while comparing a value of the voltage $V_L$ with a preset voltage value, and a gate signal of the FET 2b of the DC-DC converter 2 is controlled and thereby, the voltage $V_L$ monotonously increases to 400 V and the capacitor 2d is charged. Since the other input terminal of the switching circuit 5 is directly connected to the output terminal, at the same time, the capacitor 9b connected in parallel with the gap switch 9c as well as the capacitor 9d are charged. This period is a period for making lighting preparations and is called a standby period.

When a voltage stored in the capacitors 2d, 9b and 9d reaches 400 V, the gap switch 9c conducts and a large current flows in the primary winding of the pulse transformer 9a and a high voltage of about 20 kV is generated in the secondary winding of the pulse transformer 9a and a current (breakdown current) with a high peak and a short pulse width flows in the discharge lamp 6 and a gas discharge starts. While a voltage between electrodes of the discharge lamp 6 sharply drops by the gas discharge, an electric charge stored in the capacitor 2d of the DC-DC converter 2 flows into the discharge lamp 6 through the other input terminal and the output terminal of the switching circuit 5, and the gas discharge is held (gas discharge growth current). Thereafter, a current of the order of 1 A continues to be supplied to the discharge lamp 6 by the DC-DC converter 2. When the discharge lamp 6 starts to discharge, the capacitor 10 is charged through the discharge lamp 6 and the voltage $V_C$ starts to increase. Until the voltage $V_C$ increases to the order of 140 V of a value set in the microcomputer 8, the process of continuing to pass a current through the discharge lamp 6 in this DC manner. This period is called an electrode heating period. This electrode heating period is provided for heating the electrodes of the discharge lamp to sufficiently decrease a discharge voltage and also is provided for increasing to a sufficient value to discharge a voltage applied to the discharge lamp 6 at the time of reversing a switching state of the FET 5b. The voltage is found to be preferably 100 V or higher from the experiment.

When the voltage $V_C$ reaches 140 V of the internal setting value of the microcomputer 8, a pulse signal of the Sig.3 is stopped and the DC-DC converter 2 is stopped and the Sig.2 is made high and the FET 5b is made in the ON state and an electric charge stored in the capacitor 10 is supplied to the discharge lamp 6. A current flows through the discharge lamp 6 in a direction reverse to the previous period. For the electrode heating period, the voltage of as high as 140 V is applied to the discharge lamp under the condition that the discharge voltage decreases to 40 V to 90 V, so that a current larger than that of the previous period flows, but a capacity value of the capacitor 10 for DC pulse to AC pulse conversion is enough large, so that a voltage drop of the voltage $V_C$ is not much large. When a current is fed from the capacitor 10 to the discharge lamp 6 for a certain time period, the pulse signal of the Sig.3 is again turned on and the Sig.2 is made low and the DC-DC converter 2 is actuated and the FET 5b is made in the OFF state and an electric charge is supplied from the DC-DC converter 2 to the discharge lamp 6. This cycle is 200 Hz or more. This period is called an AC discharge period. By comparing the current output $I_L$ and the voltage output $V_L$ with the setting value of the microcomputer 8, electric power control is performed, and the FET 2b of the DC-DC converter 2 is controlled by the signal Sig.3 so as to hold the electric power 34 W speedily after entering the AC discharge period.

In the embodiment as described above, use of one FET will suffice in comparison with use of four FETs in the H bridge configuration of the conventional switching circuit, so that it is found that cost reduction and miniaturization can be achieved even in the case that the capacitor 10 is added including a gate control circuit of each the FET.

Also, in the embodiment, timing of switching in the switching circuit part is controlled by detecting the voltage $V_C$ of the capacitor, so that a stable discharge emission can be obtained. That is, after the discharge lamp is lighted, it is controlled so as to heat the electrodes of the discharge lamp by the discharge lamp current until the voltage $V_C$ of the capacitor reaches a predetermined voltage, so that at the time of reversing a switching state, the voltage applied to the discharge lamp increases to a sufficient value and thereby the stable discharge emission can be obtained.

Incidentally, in the embodiment shown in FIG. 1, a position of the capacitor 10, the resistor 11 and the diode 12 provided in parallel with the capacitor 10 is arranged in series with the discharge lamp 6 in a circuit of connecting one input terminal (input terminal of the side of the FET 5b) of the switching circuit 5 to the igniter circuit 9, but the position may be arranged in series with the discharge lamp 6 in a circuit of connecting the side of the output terminal of the switching circuit 5, namely the output terminal of the switching circuit 5 to the igniter circuit 9.

Second Embodiment

Figure 3:
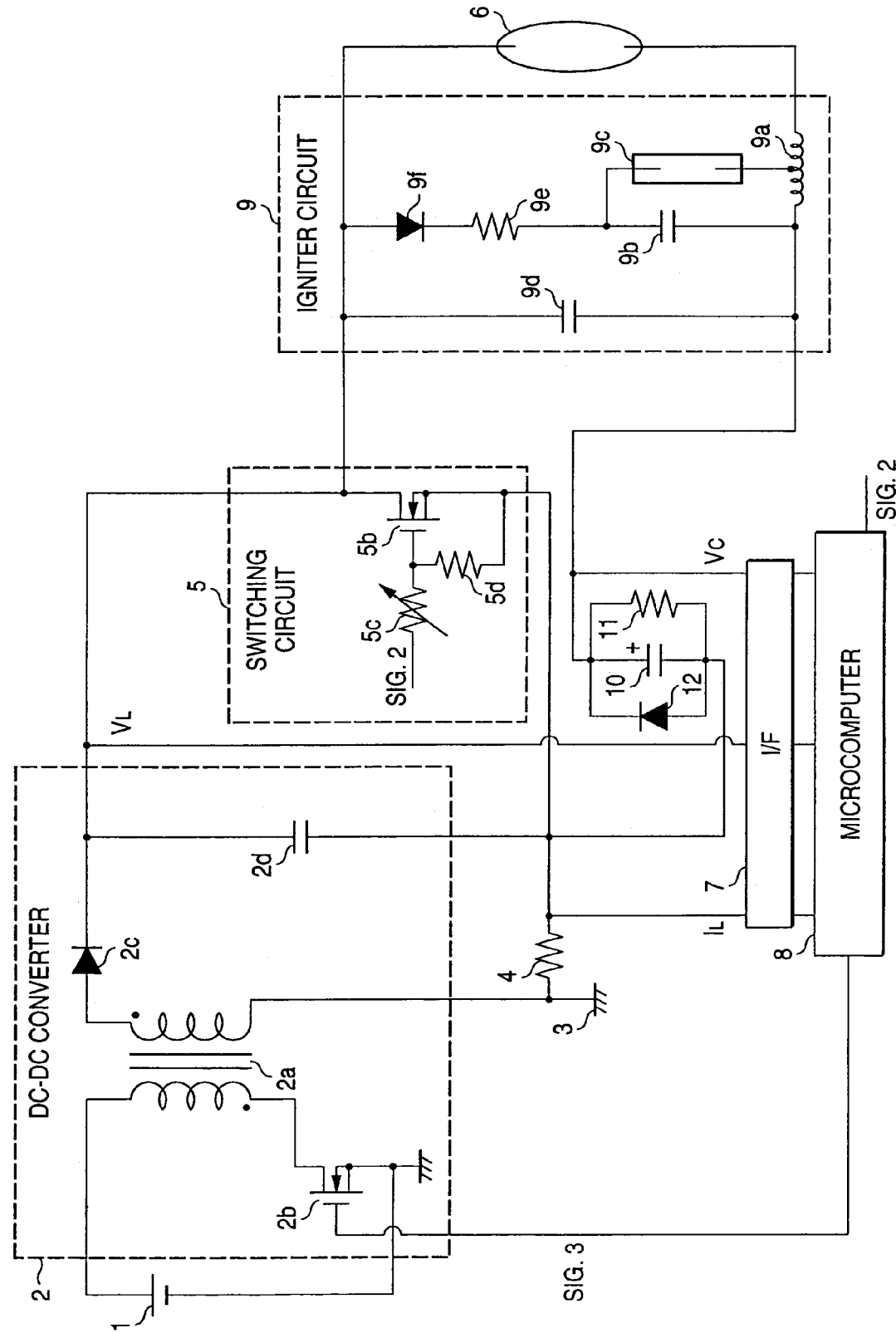
FIG. 3 is a circuit configuration diagram showing a discharge lamp lighting apparatus according to a second embodiment of the invention.

FIG. 3 is a circuit configuration diagram showing a switching circuit part according to a second embodiment of the invention. A capacity value of a capacitor 10 for DC pulse to AC pulse conversion is in the order of 1/10 compared with the first embodiment. This is because the capacitor 10 with the smaller capacity value is better when considering further miniaturization and cost reduction. In this second embodiment, a circuit configuration and a control method in the case of reducing the capacitor capacity will be described.

As shown in FIG. 3, the second embodiment differs from the first embodiment in a configuration of a switching circuit 5. In the embodiment, a resistor 5d is connected between a gate and a source of an FET 5b, and a variable resistor 5c is placed between a connection point between the gate of the FET 5b and the resistor 5d and an I/F 7. A gate voltage of the FET 5b can be regulated by varying a resistance value of the variable resistor 5c. A current with a certain value or larger does not flow by throttling the gate voltage of the FET 5b. Though the capacitor with a sufficiently large capacity is used in the first embodiment, this capacity value is small in the second embodiment of the invention, so that a voltage drop becomes large in case that a large current flows in a short time and a discharge runs out due to lack of a discharge voltage. The reason why such a circuit configuration is formed is because by regulating the gate voltage so that a current with 2.5 A or larger does not flow, the voltage drop generated during a period of passing a current from the capacitor 10 for DC pulse to AC pulse conversion to a discharge lamp 6 is made as small as possible.

Incidentally, a diode 12 for prevention of a reverse polarity voltage is connected in parallel with the capacitor 10 for DC pulse to AC pulse conversion, but it goes without saying that the diode 12 is not necessary in case of using a capacitor with no polarity such as a film capacitor as the capacitor 10.

Next, operations will be described.

Figure 4:
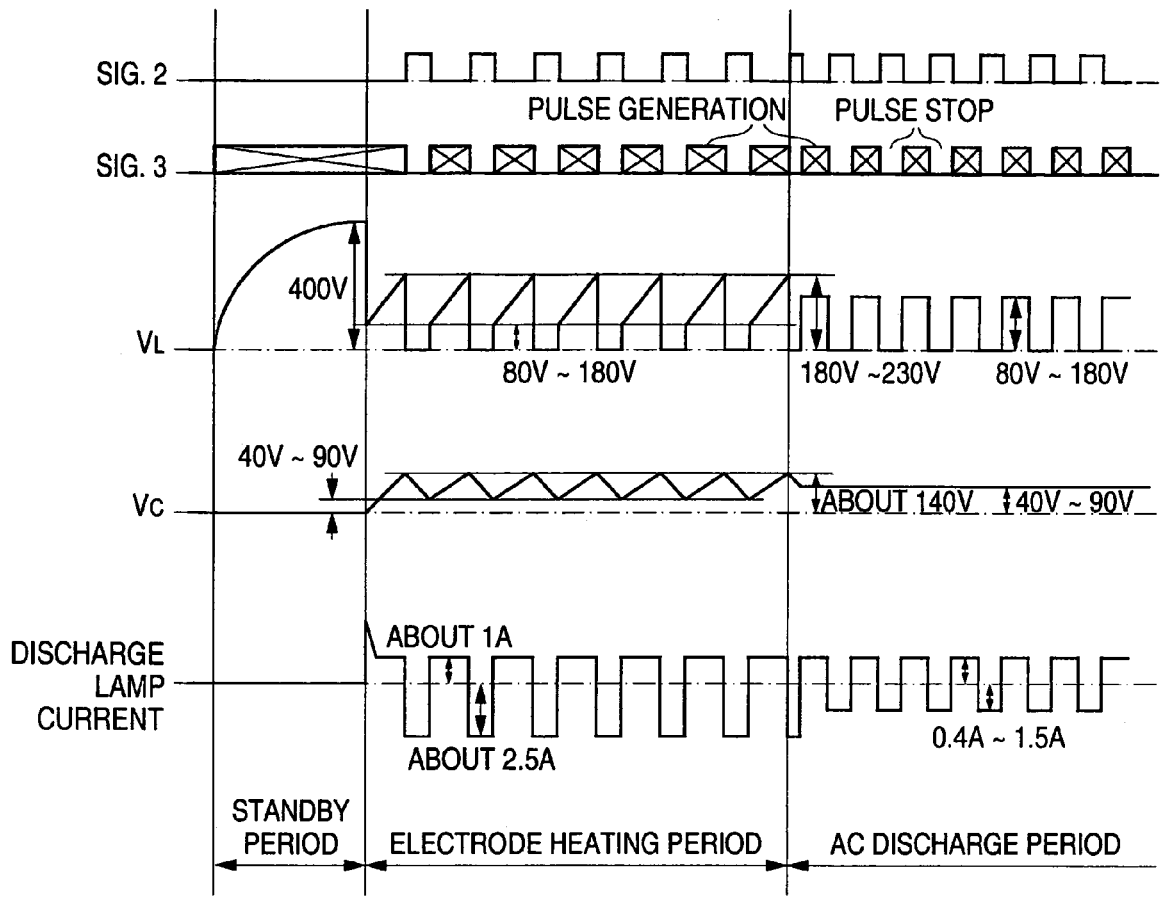
FIG. 4 is a waveform chart showing a signal waveform, a voltage waveform and a discharge lamp current waveform of the discharge lamp lighting apparatus according to the second embodiment of the invention.

FIG. 4 shows signal waveforms of Sig.2, Sig.3 and output waveforms of voltages $V_L$, $V_C$ and a discharge lamp current. A period different from the first embodiment is starts of an electrode heating period and an AC discharge period. A standby period is identical to the first embodiment. When the electrode heating period starts, a breakdown current and a discharge growth current flow in like manner. Then, the capacitor 10 is charged through the discharge lamp 6 by actuating a DC-DC converter 2. When the voltage $V_C$ of the capacitor 10 reaches a voltage (the order of 140 V) preset in a microcomputer 8, the actuation of the DC-DC converter 2 is stopped and the FET 5b is turned on and a reverse directional current is passed through the discharge lamp 6. An electric charge of the capacitor 10 is discharged to the discharge lamp 6 and the discharge lasts. Also at that time, a switch state is held until the voltage $V_C$ reaches the discharge voltage of the lamp (the $V_L$-$V_C$ value stored in the microcomputer 8 while the FET 5b is turned off in the previous discharge cycle) by control of the microcomputer 8. If a condition of $V_C$=the discharge voltage of the lamp is satisfied, the DC-DC converter 2 is actuated and the FET 5b is turned off and the electric charge is supplied from the DC-DC converter to the discharge lamp 6 again and the discharge is lasted. Also at this time, the switch state is held until the voltage $V_C$ reaches 140 V. This cycle is repeated until an integral value of the discharge lamp current $I_L$ detected by a shunt resistor 4 reaches 60 mAs (60 mC). The reason why this cycle is repeated plural times during the electrode heating period is because the capacity value of the capacitor 10 is small relative to the first embodiment, and this means that plural tomes are necessary to attain the total amount of electric charge to be applied to the discharge lamp for electrode heating to a defined value set by the microcomputer 8.

Also, in the second embodiment, the gate voltage of the FET 5b is throttled and the current flowing in the case of turning on the FET 5b is limited, so that the voltage drop of the capacitor 10 is suppressed, and time for supplying a current from the capacitor 10 to the discharge lamp 6 can be made even though the capacity value of the capacitor 10 is small in the order of 1/10 of that of the first embodiment.

After the electric charge amount of 60 mAs is supplied to the discharge lamp 6, an operation proceeds to the AC discharge period. In the case that the DC-DC converter 2 is actuated and the FET 5b is shifted in the OFF state, an operation proceeds to the AC discharge period when the voltage $V_L$ becomes equal to a value doubling the discharge voltage of the lamp stored in the microcomputer 8 in the previous discharge cycle. In the case that the DC-DC converter 2 is stopped and the FET 5b is shifted in the ON state, an operation proceeds to the AC discharge period when the voltage $V_C$ becomes equal to the discharge voltage of the lamp stored in the microcomputer 8 in the previous discharge cycle. The AC discharge period is driven at 200 Hz or higher in a manner similar to the first embodiment, and the discharge lamp 6 is lighted in an AC discharge by repeating a process of actuating the DC-DC converter 2 and turning off the FET 5b and a process of stopping the DC-DC converter and turning on the FET 5b in a manner similar to the electrode heating period. Electric power at the time of steady-state discharge is controlled at 34 W in like manner.

Third Embodiment

In the first and second embodiments shown in FIGS. 1 and 3, the capacitor 2d acting as voltage smoothing and a current source at the time of discharge start is placed in the DC-DC converter 2. In case of performing switching operation without idea, when the switch FET 5b is turned on, all the electric charges stored in the capacitor 2d at the time of actuating the DC-DC converter is consumed by ON resistance of the switch FET 5b and a large loss of electric power is caused. The loss of electric power in that case is estimated. A voltage applied to the discharge lamp 6 at the actuation by 34 W in a steady state is about 85 V and for example, in case that an AC discharge is performed at a capacitor capacity value with 1 μF and 1 kHz, a loss P of electric power becomes the value P=(½)×(1 μF)×(85V×2)²×(1 kHz)=14.45 W.

Figure 5:
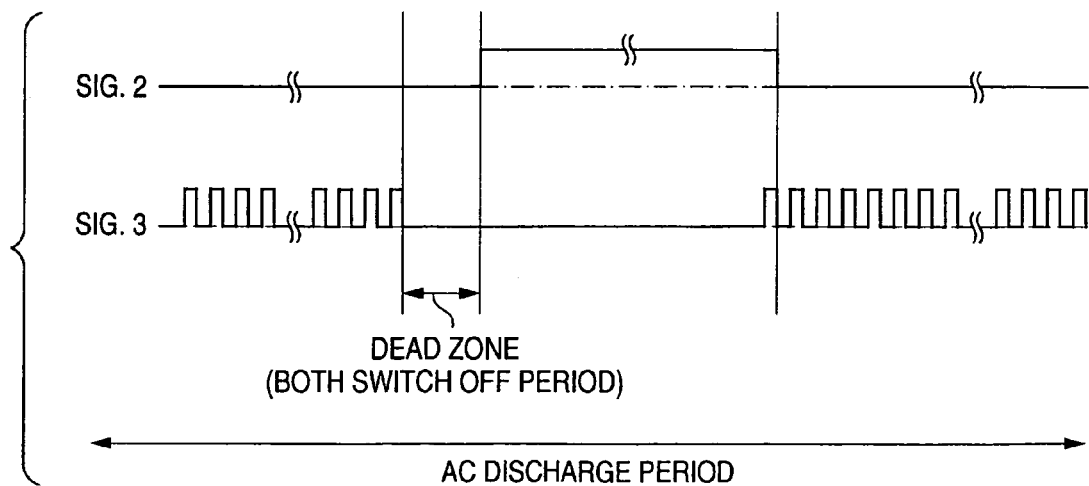
FIG. 5 is a chart showing timing of a signal waveform, during an AC discharge period, of a discharge lamp lighting apparatus according to a third embodiment of the invention.

In a third embodiment, switching is devised and it is formed so as to suppress this loss of electric power, and FIG. 5 is a chart showing timing of a signal waveform during an AC discharge period of a discharge lamp lighting apparatus according to the third embodiment. In the AC discharge period, immediately before the FET 5b at the time of switch shift is turned on, both the OFF periods (a dead period shown in FIG. 5) overlaying a stop period of the DC-DC converter on an OFF period of the FET 5b are provided. The dead period of this switch is a period of supplying the electric charge stored in the capacitor 2d until a discharge lamp voltage becomes a value close to zero of the extent to which a discharge does not run out. For example, if a period in which a $V_L$ voltage of 170 V (85 V×2) becomes 100 V forward from 85 V which is a $V_C$ voltage is considered as the dead period and the conditions described above are used, a loss P' of electric power can be reduced to the value P'=(½)×(1 μF)×(100V)²×(1 kHz)=5 W.

Fourth Embodiment

Figure 6:
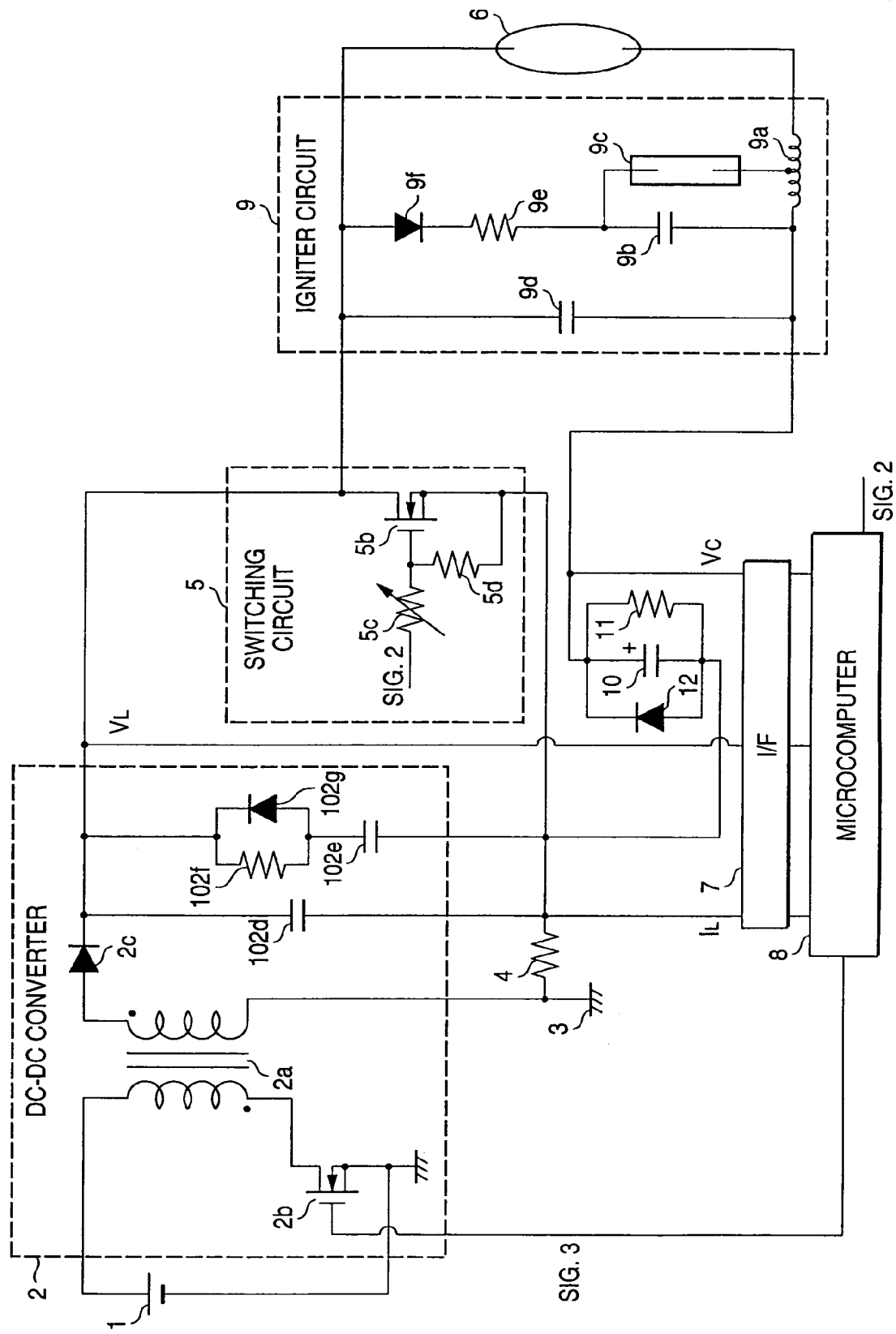
FIG. 6 is a circuit configuration diagram showing a discharge lamp lighting apparatus according to a fourth embodiment of the invention.

FIG. 6 is a circuit configuration diagram of a discharge lamp lighting apparatus according to a fourth embodiment of the invention and is the discharge lamp lighting apparatus of a circuit configuration for reducing a loss of electric power other than the third embodiment described in FIG. 5.

A capacitor 102d (second capacitor) is provided in a position in which the capacitor 2d within the DC-DC converter is placed and further, a resistor 102f and a diode 102g are connected in parallel and a capacitor 102e (first capacitor) is connected in series, and the capacitor 102e, the resistor 102f and the diode 102g are connected in parallel with the capacitor 102d. A cathode of the diode 102g is connected to a cathode of a diode 2c and an anode is connected to the capacitor 102e. Operations are identical to that of the second embodiment.

Functions of the capacitor 2d having roles of voltage smoothing and a current supply source at the time of discharge start in the first to third embodiments are separated, and the role of the smoothing is shared in the capacitor 102d and the role of the current supply source at the time of discharge start is shared in the capacitor 102e. In the embodiment, a capacity value of the capacitor 102d is set to a value in which the loss of electric power does not become large too and the voltage smoothing can be performed to some extent, and a capacity value of the capacitor 102e is set to a value capable of supplying the current at the time of discharge start similar to the capacitor 102d of the first to third embodiments, and a resistance value of the resistor 102f is set to a value made so that a time constant defined by the capacity value of the capacitor 102e becomes large sufficiently compared with a cycle of an AC discharge period. By forming such a circuit configuration, the loss of electric power in the case of turning on an FET 5b can be reduced. Charge to the capacitor 102e is performed only for a standby period (sufficiently longer than the cycle of the AC discharge period) in which time is taken slow to 400 V. Since charge and discharge (with 200 Hz or higher) very faster than the standby period is performed in the AC discharge period, the charge is little performed due to the presence of the resistor 102f, so that the loss of electric power becomes very small. Also, the capacity value of the capacitor 102d for smoothing is reduced to a small value, so that the loss of electric power due to this capacitor is small. For example, in case where an AC discharge frequency is 1 kHz and a discharge lamp discharge voltage is 85 V and an electric charge until a $V_L$ voltage becomes 100 V from 170 V is supplied to the discharge lamp and a capacity value of the capacitor 102d is 0.1 μF, a loss P of electric power due to the capacitor 102d becomes the value P=(½)×(0.1 μF)×(100V)²×(1 kHz)=0.5 W assuming that the stored electric charge is usefully used in a discharge lamp current as described above. Since a loss of electric power due to the capacitor 102e is close to zero, the loss can be controlled to 0.5 W.

Incidentally, in the fourth embodiment, when using a capacitor with a large capacity value as described in the first embodiment as a capacitor 10, it goes without saying that the discharge lamp 6 can be lighted without problems even in case of removing resistors 5c, 5d connected to a gate of the FET 5b and performing the operations as shown in FIG. 2 in a manner similar to the first embodiment.

Also, the case of providing the dead period is indicated in the embodiment, but there is the effect of reducing the loss of electric power even by the configuration of FIG. 6 without providing the dead period.

Fifth Embodiment

Figure 7:
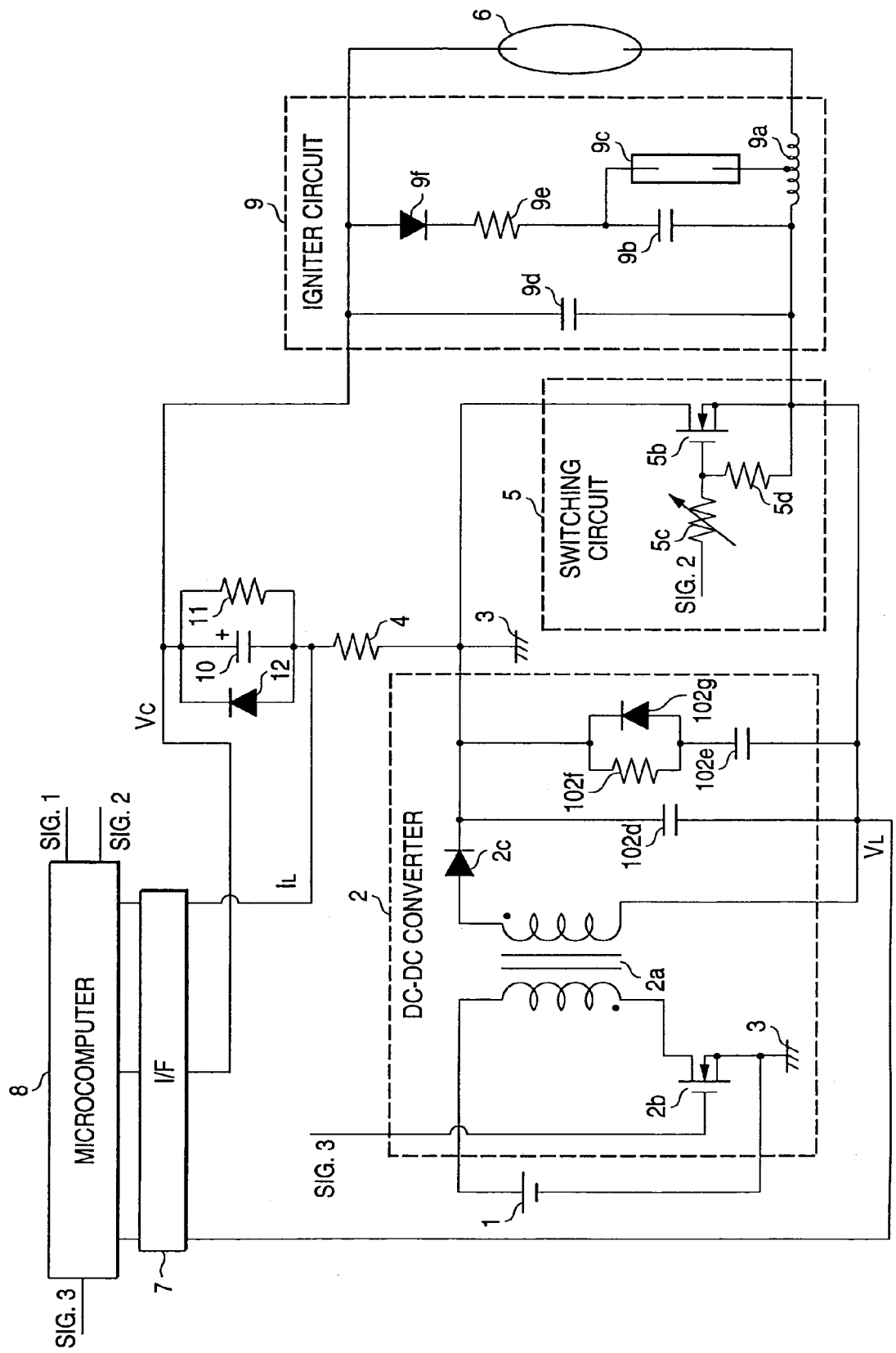
FIG. 7 is a circuit configuration diagram showing a discharge lamp lighting apparatus according to a fifth embodiment of the invention.

In lighting of a discharge lamp, the discharge lamp may be grounded to make an applied voltage minus in order to avoid a diffusion of sodium ions to a tube wall (a loss of sodium). The lighting of such a discharge lamp can be implemented very easily in the first to fourth embodiments. The circuit configuration is indicated by way of example with reference to the fourth embodiment. FIG. 7 shows a circuit configuration in the case of lighting a discharge lamp 6 by a minus pulse using a ground potential as a reference in the fourth embodiment. In the circuit configuration, plus is only shifted to minus.

In FIG. 7, points different from the fourth embodiment shown in FIG. 6 will be described. An output voltage of the high side of a DC-DC converter 2 is connected to a ground 3, and an FET 5b and resistors 5c, 5d of a switching circuit 5 are placed to output of the high side of the DC-DC converter 2 and the low side is connected to an output terminal of the switching circuit 5. Since an output pulse of the switching circuit 5 is a minus voltage pulse using a ground as a reference, a direction of a diode 12 connected in parallel with a capacitor 10 for DC pulse to AC pulse conversion is a reverse direction. Output voltages $V_L$, $V_C$ only become a minus direction, and a discharge lamp current and input signals Sig.2, Sig.3 are similar to the waveforms shown in FIGS. 4 and 5. Thus, operations are identical to that of the fourth embodiment.

Sixth Embodiment

Figure 8:
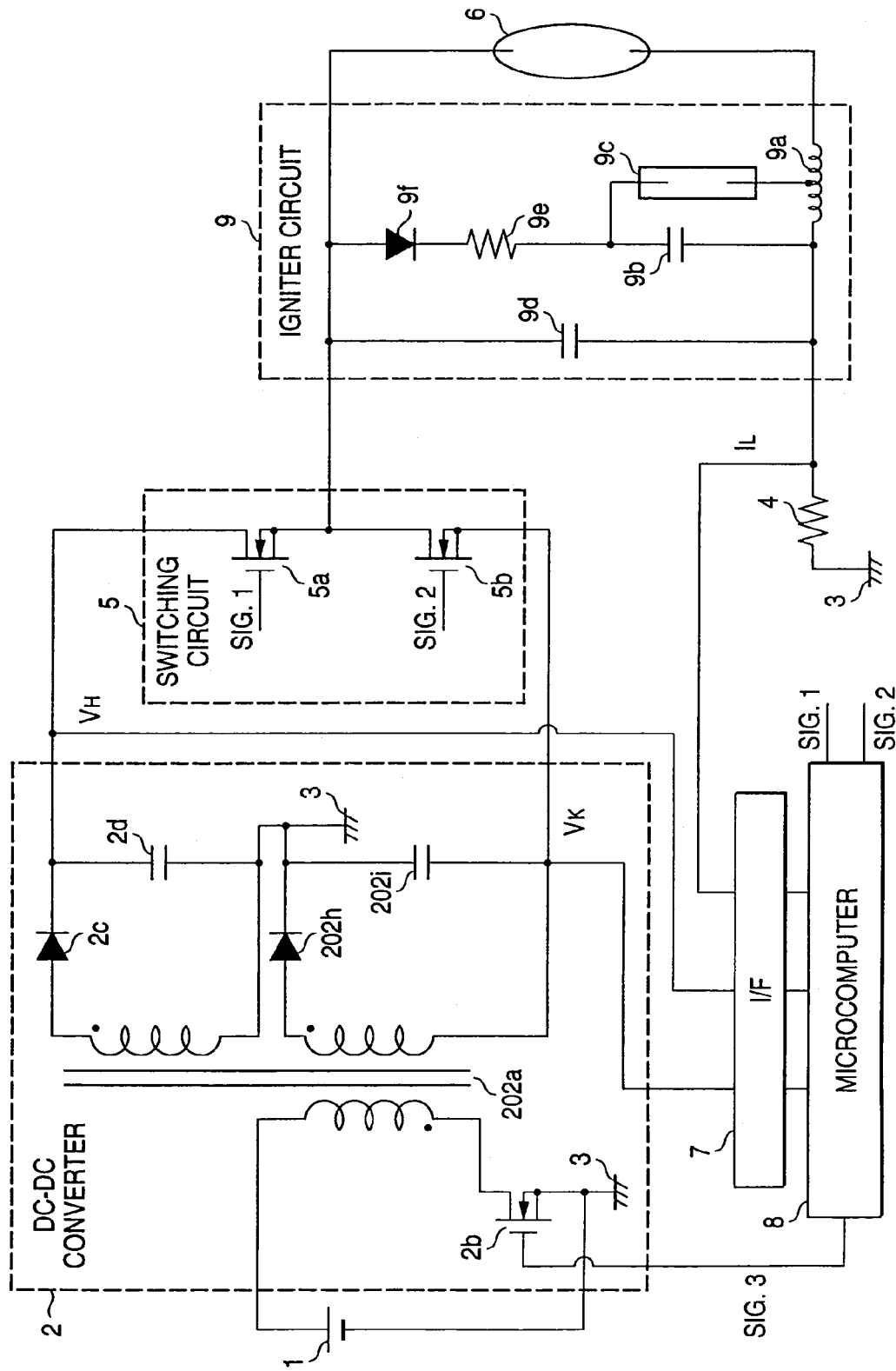
FIG. 8 is a circuit configuration diagram showing a discharge lamp lighting apparatus according to a sixth embodiment of the invention.

FIG. 8 is a circuit configuration diagram of a discharge lamp lighting apparatus according to a sixth embodiment of the invention.

While an output voltage of the DC-DC converter 2 of the first to fifth embodiments is only two levels of voltage with high and low such as a positive or negative voltage value and a ground, it is constructed so that ternary values with high, low and their center level such as positive and negative binary voltage values and a ground voltage can be outputted in the sixth embodiment. Thus, the sixth embodiment differs from the embodiments described above in a configuration of the DC-DC converter 2. The need for a capacitor for DC pulse to AC pulse conversion is also eliminated.

In the circuit configuration shown in FIG. 8, an igniter circuit 9, a discharge lamp 6, a DC power source 1, an I/F 7, a microcomputer 8 and a shunt resistor 4 are identical to that of the first to fifth embodiments. A configuration of a switching circuit 5 is a half bridge circuit comprising two switching elements having an FET 5a (first switching element) and an FET 5b (second switching element), and signals Sig.1 and Sig.2 from the microcomputer are inputted to gates of the FETs 5a and 5b. A high voltage $V_H$ is supplied to a drain of the FET 5a using a ground as a reference and a low voltage $V_K$ is supplied to a source of the FET 5b using the ground as the reference. An output terminal of the switching circuit 5 is connected to one electrode of the discharge lamp 6, and the other electrode of the discharge lamp 6 is connected to a ground 3 through a pulse transformer 9a of the igniter circuit 9 and the shunt resistor 4, and it is formed so that the other electrode becomes a center voltage level of the high voltage $V_H$ and the low voltage $V_K$.

A transformer 202a of the DC-DC converter 2 is formed of a primary winding, a secondary winding and a tertiary winding unlike the first to fifth embodiments. An anode of a diode 2c is connected to one side of the secondary winding for outputting a high voltage and the ground 3 is connected to the other side of the secondary winding. A cathode of the diode 2c is connected to the drain of the FET 5a and a capacitor 2d functioning as voltage smoothing and a current supply source at the time of discharge start, and the other side of the capacitor 2d is connected to the ground 3. Also, an anode of a diode 202h is connected to one side of the tertiary winding for outputting a voltage of the low side of the transformer 202a and the source of the FET 5b is connected to the other side of the tertiary winding. A cathode of the diode 202h is connected to the ground 3 and a capacitor 202i functioning as voltage smoothing, and the other side of the capacitor 202i is connected to the source of the FET 5b. In the sixth embodiment, a voltage $V_H$ of the high side, a voltage $V_K$ of the low side and a discharge lamp current $I_L$ are detected and comparison processing is performed by the microcomputer 8 and thereby, lighting of the discharge lamp 6 is controlled.

Next, operations will be described.

Figure 9:
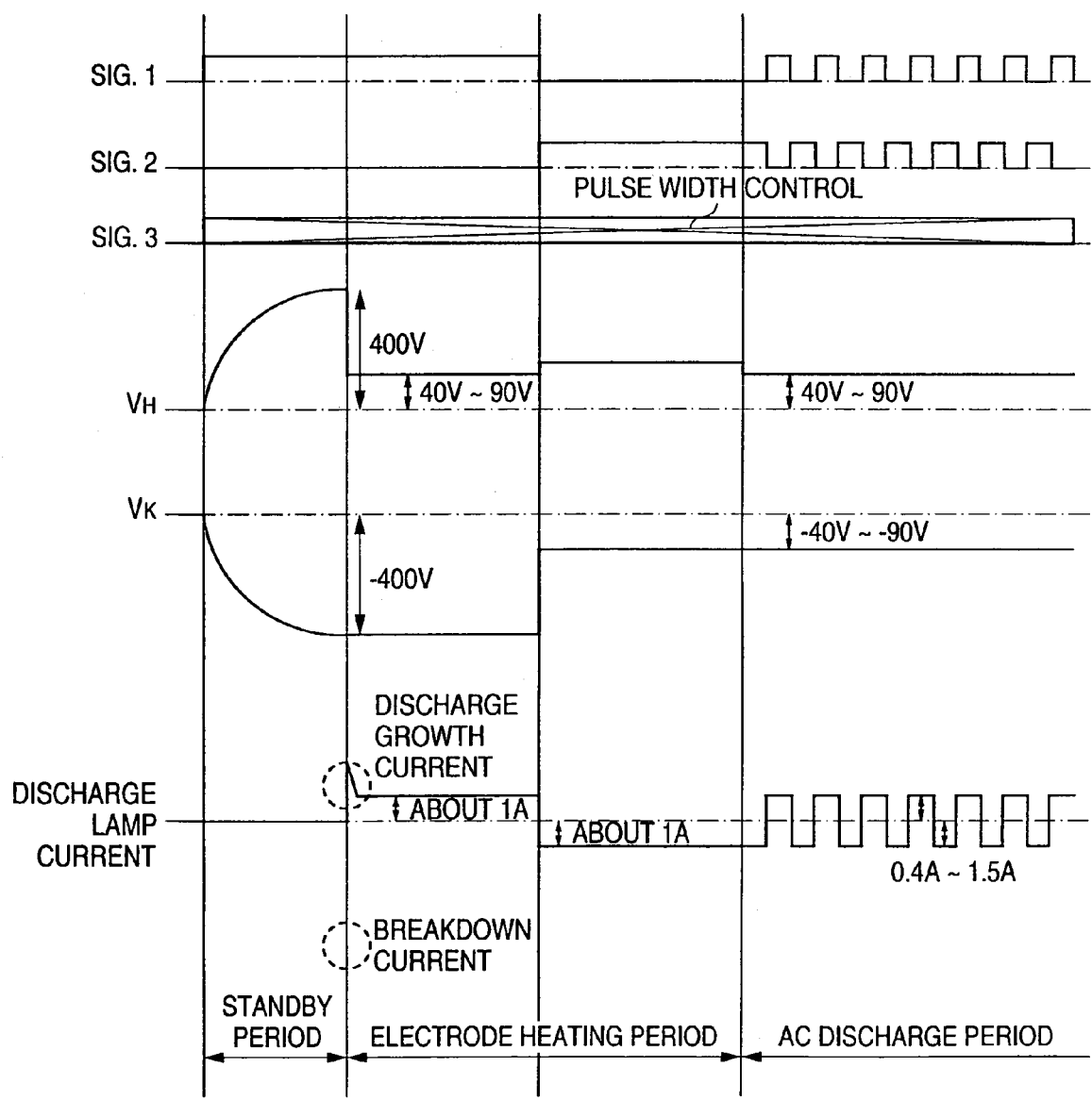
FIG. 9 is a waveform chart showing a signal waveform, a voltage waveform and a discharge lamp current waveform of the discharge lamp lighting apparatus according to the sixth embodiment of the invention.

FIG. 9 shows gate input waveforms of the FETs 5a, 5b, 2b and waveforms of the voltages $V_H$, $V_K$ and a waveform of the discharge lamp current. During a standby period, the voltage $V_H$ increases to 400 V and the voltage $V_K$ decreases to −400 V. Since the FET 5a is in the ON state and the FET 5b is in the OFF state, a capacitor 9b within the igniter circuit 9 is also charged to 400 V and a gap switch 9c conducts and a pulse voltage of about 20 kV is applied across the discharge lamp 6 to start discharge. When the discharge is started, a breakdown current flows through the discharge lamp 6, and electric charges equivalent to 400 V stored in the capacitor 2d are supplied to the discharge lamp 6 as a current at the time of discharge start.

During an electrode heating period, a switching state holds a state of the standby period and a one-way current continues to be supplied to the discharge lamp 6. When the amount of flowing electric charge reaches 30 mC by detecting the current $I_L$, the FET 5a is made in the OFF state and the FET 5b is made in the ON state, and a reverse directional current is passed through the discharge lamp 6. Also, when the amount of flowing electric charge reaches 30 mC, an operation proceeds to an AC discharge period.

During the AC discharge period, lighting of the discharge lamp 6 is controlled by AC drive of 200 Hz to 20 kHz. The absolute value of output voltages of the secondary winding and the tertiary winding of the transformer 202a in that case is 40 V to 90 V. In a steady state, the electric power of 34 W is maintained as described above.

The merit of the sixth embodiment is that two FETs will suffice relative to use of four FETs in the conventional switching circuit. Also, the need for the capacitor for DC pulse to AC pulse conversion used in the first to fifth embodiments is eliminated. Thus, there are merits in miniaturization and cost reduction.

Seventh Embodiment

In the sixth embodiment, during the standby period as shown in FIG. 9, a voltage of a maximum of 800 V is applied between the drain and the source of the FET 5*b*. Since high withstand voltage parts are large in size and are high cost, the merits in miniaturization and cost reduction is obtained even if adding another switch in case that an applied voltage can be reduced.

Figure 10:
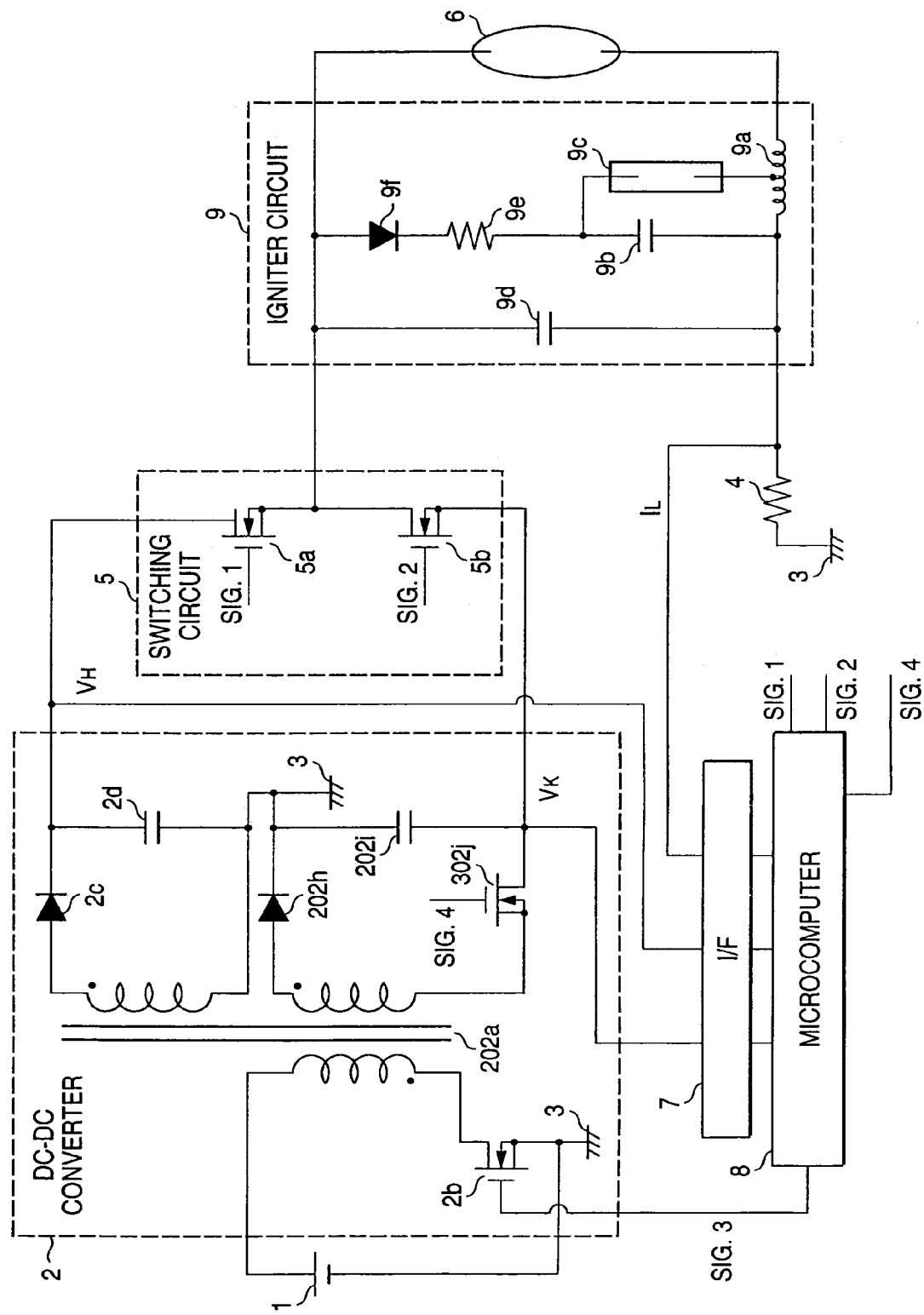
FIG. 10 is a circuit configuration diagram showing a discharge lamp lighting apparatus according to a seventh embodiment of the invention.

FIG. 10 is a circuit configuration diagram showing a discharge lamp lighting apparatus according to a seventh embodiment of the invention. The seventh embodiment differs from the sixth embodiment only in that an FET 302*j* is placed between the tertiary winding of the transformer 202*a* and the FET 5*b*. A signal Sig.4 from a microcomputer 8 is inputted to a gate of the FET 302*j*.

Next, operations will be described.

Figure 11:
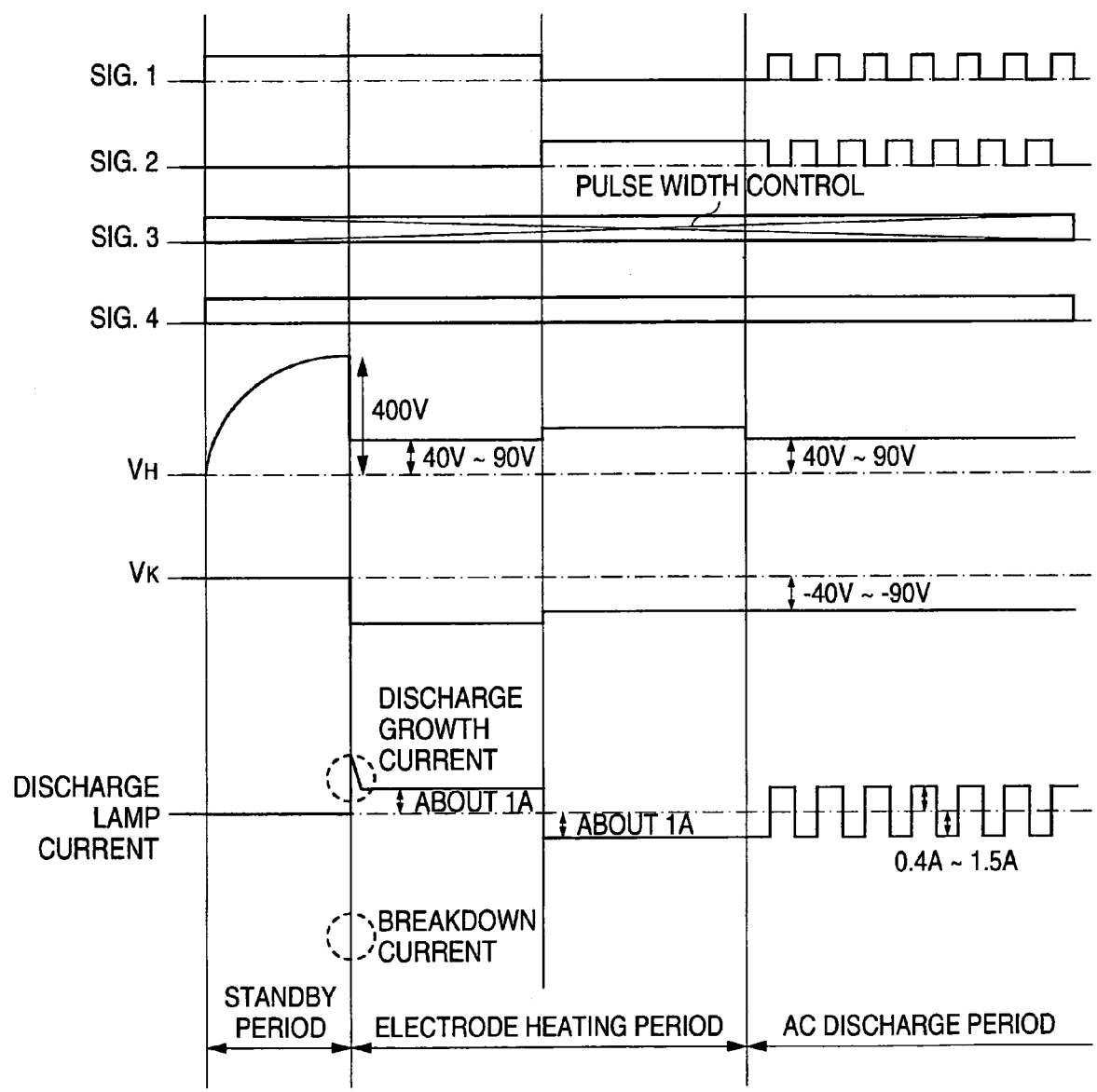
FIG. 11 is a waveform chart showing a signal waveform, a voltage waveform and a discharge lamp current waveform of the discharge lamp lighting apparatus according to the seventh embodiment of the invention.

FIG. 11 shows FET gate input waveform operations Sig.1, Sig.2, Sig.3, Sig.4 and output waveform voltages $V_H$, $V_K$ and a discharge lamp current waveform. The seventh embodiment differs from the sixth embodiment (FIG. 9) only in a standby period, and during the standby period, the voltage $V_K$ is zero since the FET 302*j* is made in the OFF state. By making the FET 302*j* in the OFF state during the standby period, the voltage applied to the FET 5*b* becomes a maximum of 400 V, so that a switching element with a withstand voltage lower than that of the switching element used in the sixth embodiment can be used, with the result that miniaturization and cost reduction can be achieved.

Eighth Embodiment

Figure 12:
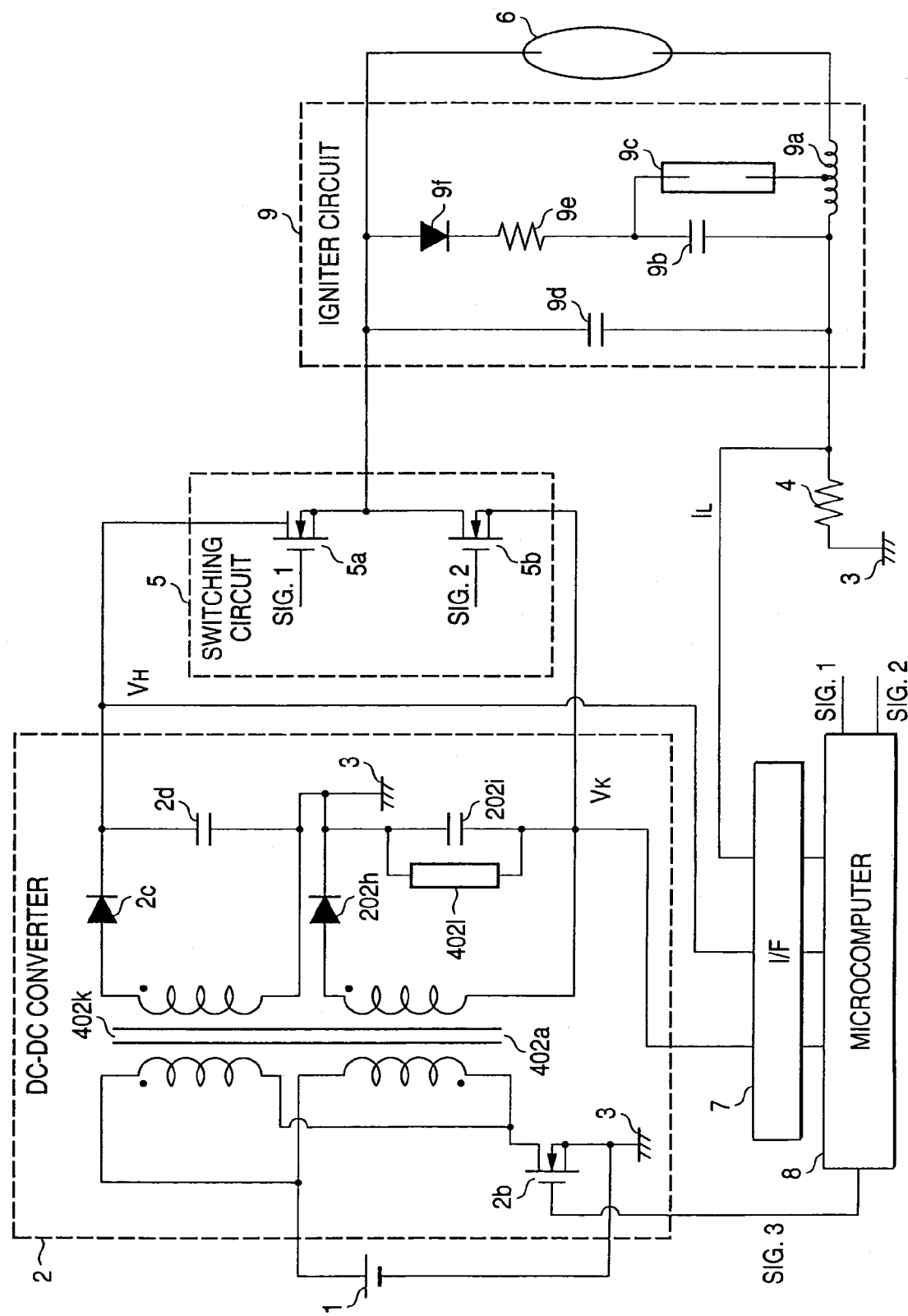
FIG. 12 is a circuit configuration diagram showing a discharge lamp lighting apparatus according to an eighth embodiment of the invention.

FIG. 12 is a circuit configuration diagram showing a discharge lamp lighting apparatus according to an eighth embodiment of the invention, and a problem of applying the voltage of a maximum of 800 V to the FET 5*b* of the sixth embodiment is solved without adding a switch in a manner similar to the seventh embodiment.

The eighth embodiment is similar to the sixth and seventh embodiments except for a DC-DC converter 2.

The eighth embodiment differs from the sixth embodiment in that a transformer having a primary winding, a secondary winding and a tertiary winding is replaced with two transformers 402*a*, 402*k* having a primary winding and a secondary winding and a voltage clamping element 402*l* is connected in parallel with a capacitor 202*i* in the DC-DC converter 2. A resistor or a Zener diode is considered as the clamping element 402*l*. In the embodiment, the Zener diode with 150 V is used as the clamping element 402*l*.

Next, operations will be described.

Figure 13:
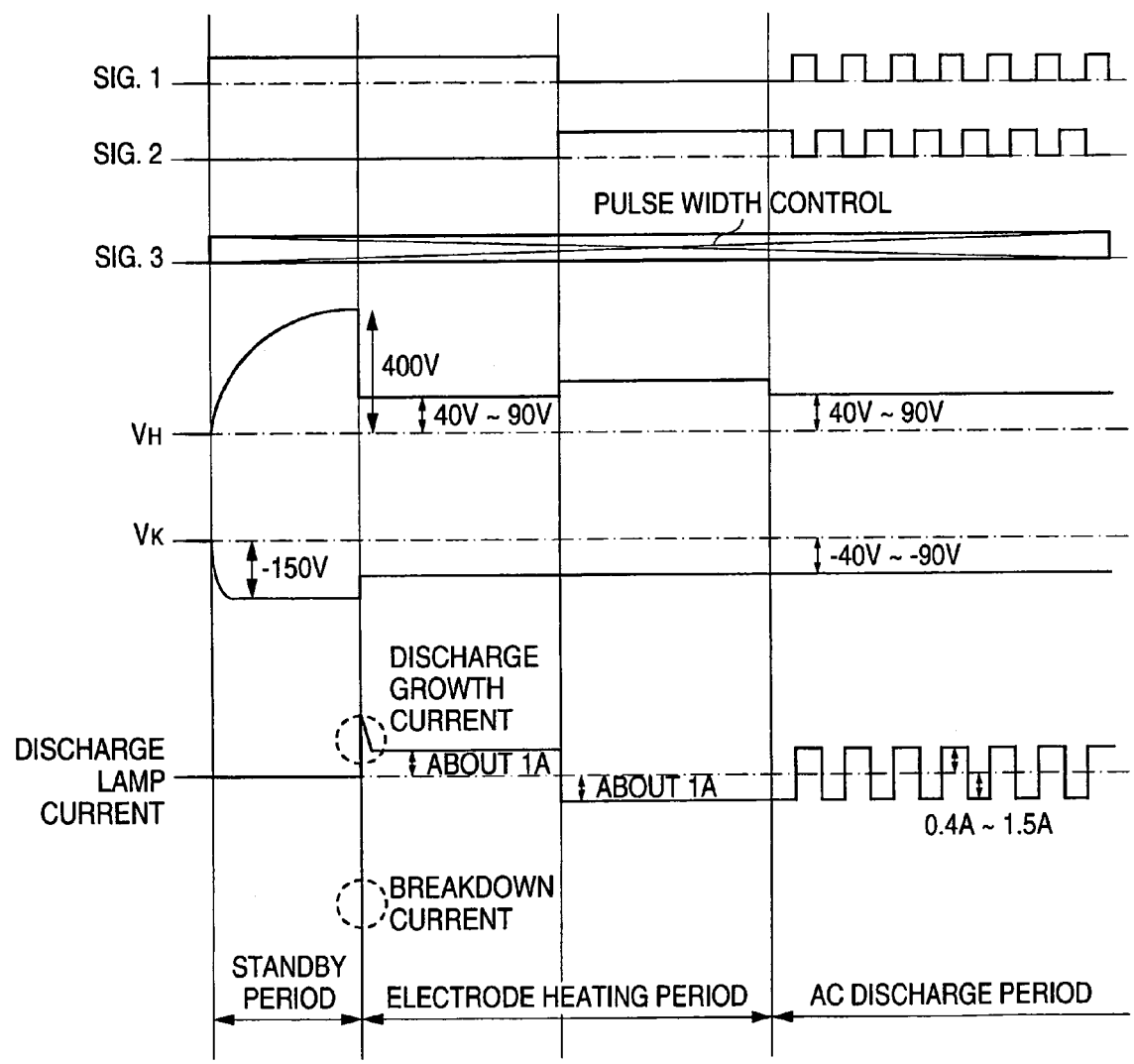
FIG. 13 is a waveform chart showing a signal waveform, a voltage waveform and a discharge lamp current waveform of the discharge lamp lighting apparatus according to the eighth embodiment of the invention.

FIG. 13 shows FET gate input waveforms Sig.1, Sig.2, Sig.3 and output voltage waveforms $V_H$, $V_K$ and a discharge lamp current waveform. The eighth embodiment differs from the sixth embodiment (FIG. 9) in a period during which the FET 5*b* is turned on (a standby period and the first half of an electrode heating period), and during the period, the clamping element 402*l* acts and the voltage $V_K$ is kept at −150 V. Thus, a voltage of a maximum of 550 V is applied to the FET 5*b* and it is found that a switching element with a withstand voltage lower than that of the sixth embodiment can be used.

Ninth Embodiment

Figure 14:
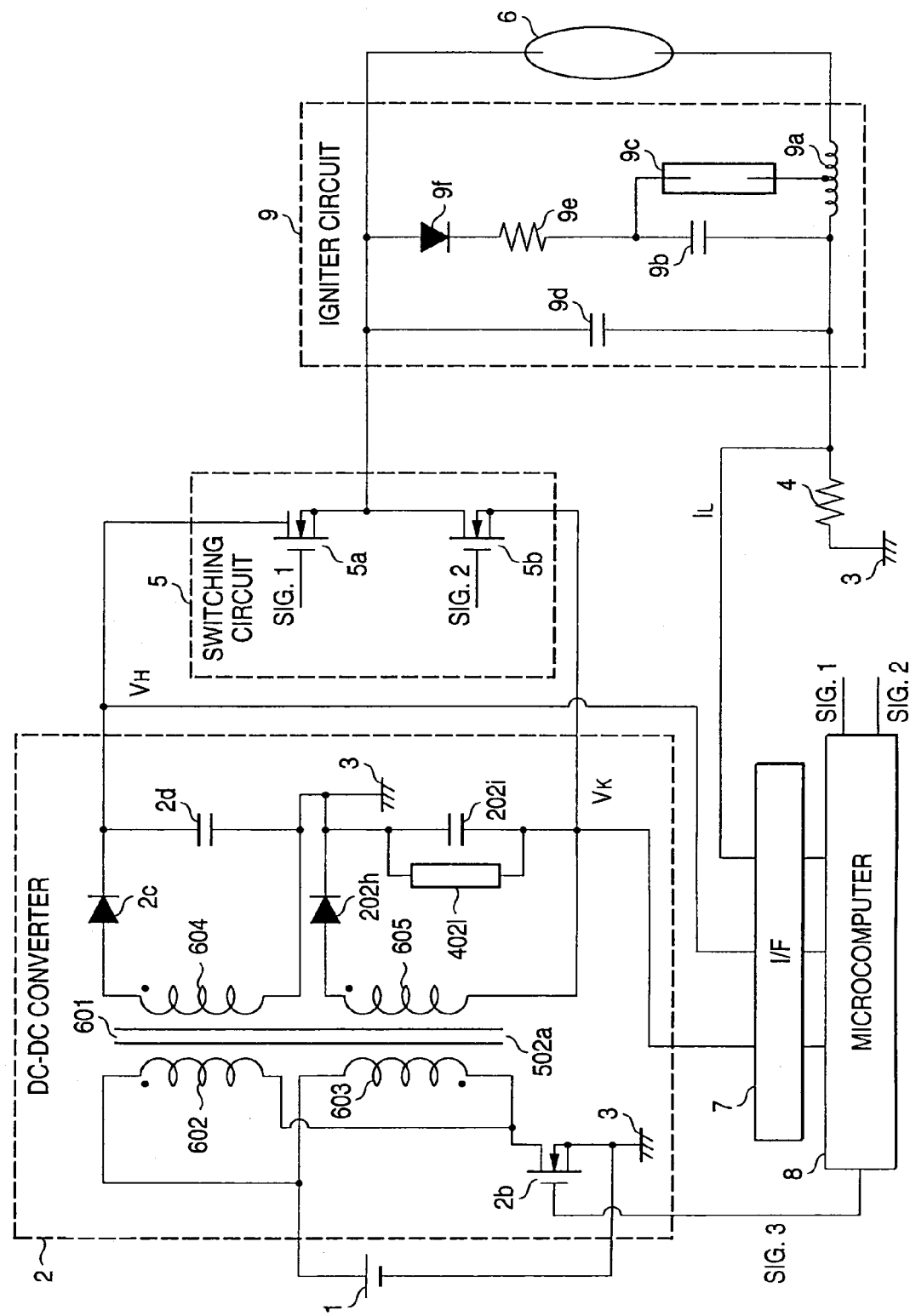
FIG. 14 is a circuit configuration diagram showing a discharge lamp lighting apparatus according to a ninth embodiment of the invention.
Figure 15:
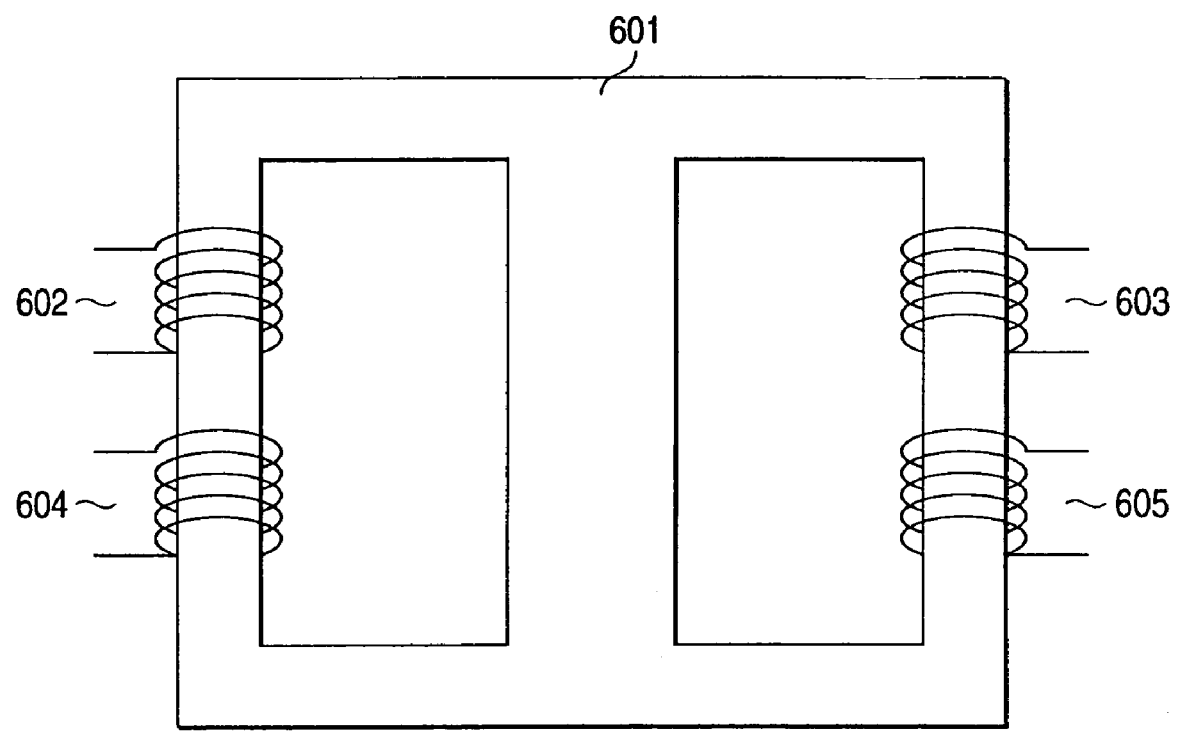
FIG. 15 is a configuration view of a transformer according to the ninth embodiment of the invention.

FIG. 14 is a circuit configuration diagram showing a discharge lamp lighting apparatus according to a ninth embodiment of the invention. The ninth embodiment is similar to the eighth embodiment except for a transformer of a DC-DC converter 2. A transformer 502*a* has an integral structure as shown in FIG. 15. Numeral 601 is a core, and numerals 602 and 603 are primary windings, and numeral 604 is a secondary winding, and numeral 605 is a tertiary winding. Typically, in the transformer, all the windings are wound in the center of the core, but the transformer of the embodiment has a structure in which a primary winding and a secondary winding are wound in one end portion of the core and a primary winding and a tertiary winding are wound in the other end portion. By forming such a transformer structure, an output voltage of the secondary winding can be increased even if output of the tertiary winding is clamped at −150 V.

Next, operations will be described.

Input and output waveforms are similar to that of the eighth embodiment shown in FIG. 13 and the operations are also similar.

In the sixth to ninth embodiments, the transformer structure is complicated or withstand voltage property of the FET element is required, but the number of switching elements is decreased to two in comparison with the need of four switching elements in the conventional switching circuit, so that there are merits in miniaturization and cost reduction.

Tenth Embodiment

Figure 16:
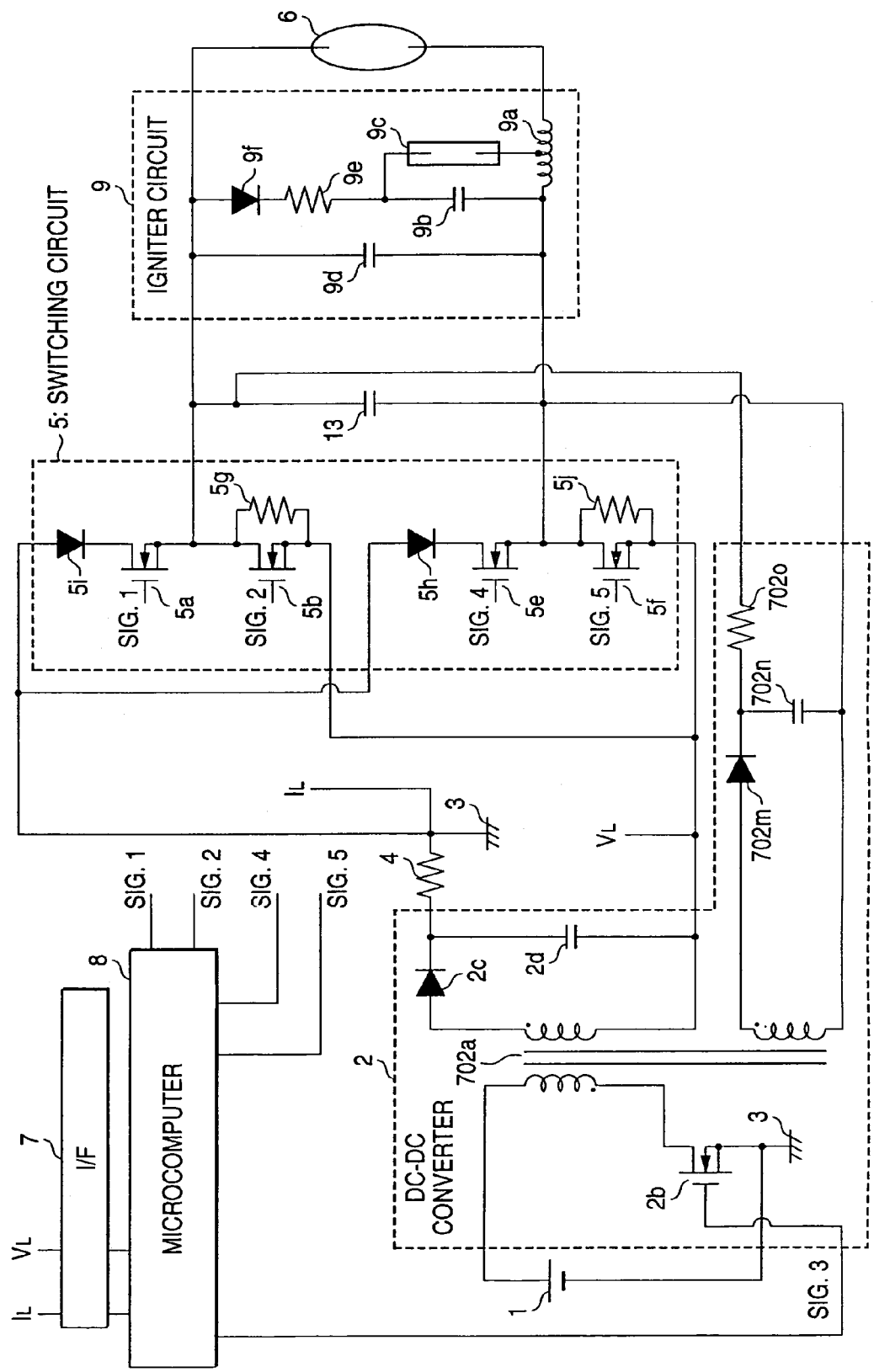
FIG. 16 is a circuit configuration diagram showing a discharge lamp lighting apparatus according to a tenth embodiment of the invention.

FIG. 16 is a circuit configuration diagram showing a discharge lamp lighting apparatus according to a tenth embodiment of the invention. In the first to ninth embodiments, the number of FETs forming the switching circuit 5 is decreased, but in the tenth embodiment, a withstand voltage of each the element is reduced to achieve miniaturization and cost reduction while the number of FETs is four equal to the conventional type.

A discharge lamp 6, an igniter circuit 9, a shunt resistor 4 and an I/F 7 are identical to that of the first to ninth embodiments. In a microcomputer 8, the number of FETs to be controlled increases, so that five signals Sig.1 to Sig.5 are outputted.

A transformer 702*a* of a DC-DC converter 2 comprises three windings of one input and two outputs. In a primary winding, a current is passed by an FET 2*b* in a manner similar to the first to ninth embodiments. One side of a secondary winding is connected to an anode of a diode 2*c* and the other side of the secondary winding is connected to a source of an FET 5*f* of a switching circuit 5. A voltage of the source of this FET 5*f* is a voltage $V_L$ to be detected. A cathode of the diode 2*c* is connected to a capacitor 2*d* for voltage smoothing and also is connected to an anode of a diode 5*i* of the switching circuit 5 through the shunt resistor 4 and is connected to a ground 3. A current $I_L$ is detected by the shunt resistor 4. Also, one side of a tertiary winding is connected to an anode of a diode 702*m* and the other side of the tertiary winding is connected to the side of a pulse transformer 9*a* of an output terminal of the switching circuit 5. A capacitor 702*n* for voltage smoothing is connected between the diode 702*m* and the tertiary winding, and a cathode of the diode 702*m* is connected to the other output terminal of the switching circuit 5 through a resistor 702*o*. The winding ratio of the secondary winding to the tertiary winding of the transformer 702*a* is 1:4, and the tertiary winding outputs 400 V when the secondary winding outputs −100 V. Since only a function of the voltage smoothing is required, the capacitors 2d and 702n have 0.1 μF in this embodiment. The resistor 702o requires a high resistance value in order to reduce a loss of electric power due to the voltage caused by the tertiary winding in a steady state, and has 100 kΩ in this embodiment.

The switching circuit 5 is a H bridge circuit similar to the conventional example. An FET 5a and an FET 5e act to shift a high voltage, and an FET 5b and the FET 5f act to shift a low voltage. A cathode of the diode 5i is connected to a drain of the FET 5a and a cathode of the diode 5j is connected to a drain of the FET 5f. Also, a resistor 5g of 100 kΩ is connected in parallel with the FET 5b and a resistor 5h of 100 kΩ is connected in parallel with the FET 5e. A connection point between a source of the FET 5a and a drain of the FET 5b becomes the output terminal of the switching circuit 5 and is connected to one electrode of the discharge lamp 6. Also, a connection point between a source of the FET 5e and an anode of the diode 5j becomes the other output terminal and is connected to the primary winding of the pulse transformer 9a.

A capacitor 13 is connected between the output terminals of the switching circuit 5. This acts as initial current supply means for supplying a current to the discharge lamp at the time of discharge start. In this embodiment, the capacitor 13 has 1 μF. In the tenth embodiment thus, a current supply source (capacitor 13) at the time of discharge start is placed in the output terminals of the switching circuit 5, and charge to 400 V of the capacitor 13 and a capacitor 9b during a standby period is performed using the tertiary winding of the transformer 702a.

Next, operations will be described.

Figure 17:
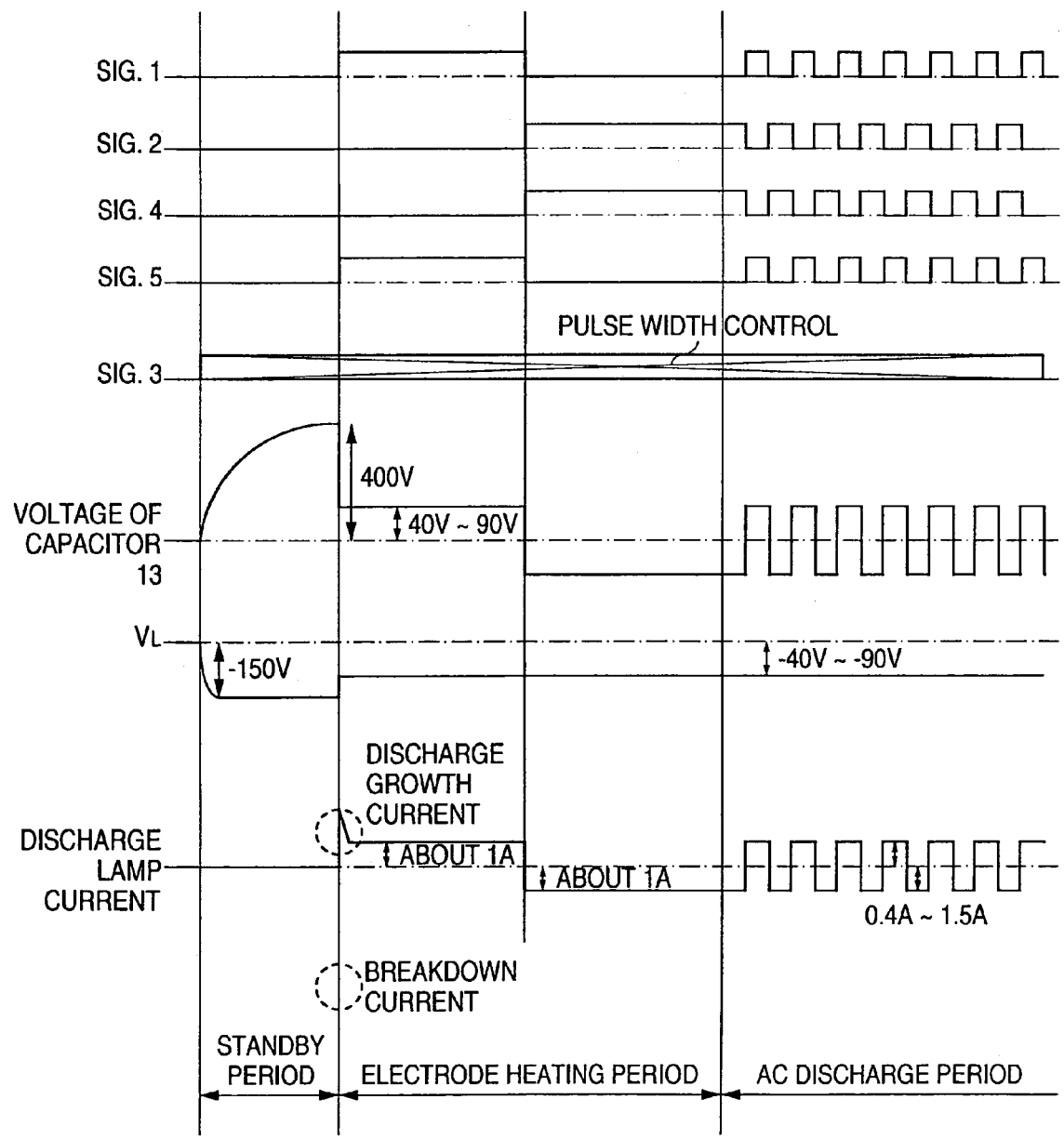
FIG. 17 is a waveform chart showing a signal waveform, a voltage waveform and a discharge lamp current waveform of the discharge lamp lighting apparatus according to the tenth embodiment of the invention.
Figure 18:
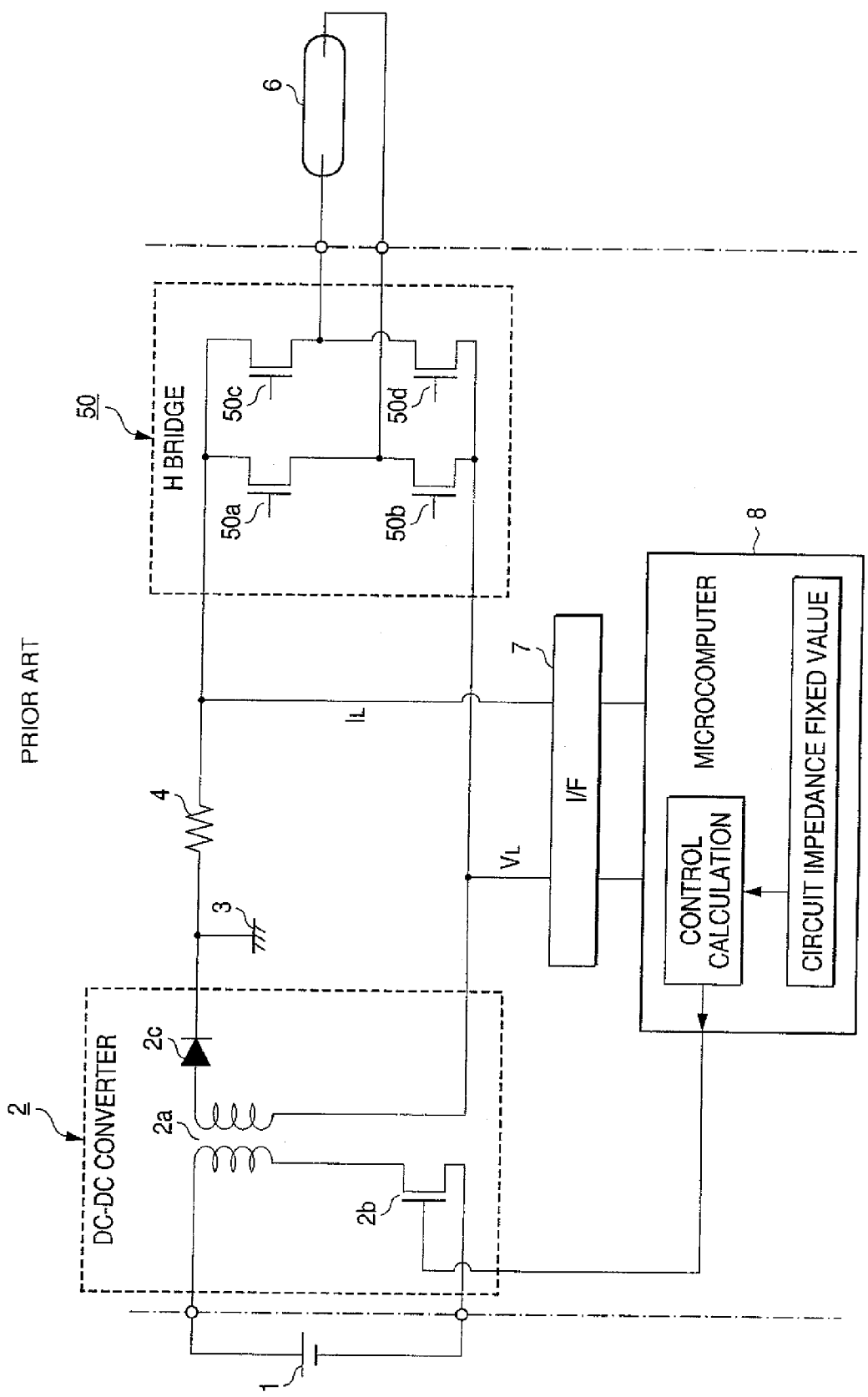
FIG. 18 is a circuit configuration diagram of a conventional discharge lamp lighting apparatus.
Figure 19:
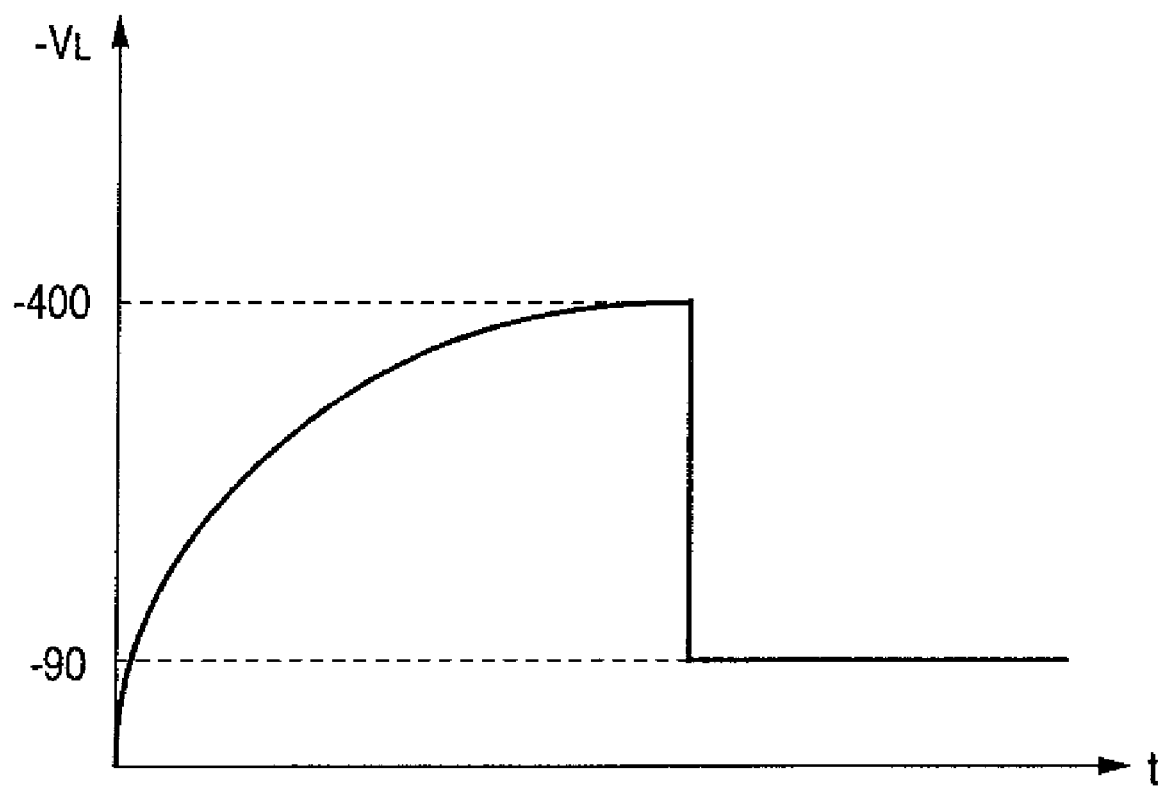
FIG. 19 is a waveform chart showing a voltage waveform at the time of starting in the conventional discharge lamp lighting apparatus.

FIG. 17 shows gate input signal waveforms Sig.1 to Sig.5 and a voltage of the capacitor 13 and a voltage waveform of $V_L$ and a discharge lamp current waveform. During a standby period, Sig.1, Sig.2, Sig.4 and Sig.5 are in the OFF state and only the DC-DC converter is controlled by pulse width control. In this case, the voltage $V_L$ is controlled at −150 V and the voltages of the capacitor 13 and the capacitor 9b are increased to 400 V. In this case, only a voltage of a maximum of 275 V is applied between the drain and the source of the FETs 5a, 5b, 5e and 5f.

When the voltage reaches 400 V, a gap switch 9c conducts and a pulse voltage of about 20 kV is applied to the discharge lamp 6 to start discharge. When the discharge is started, a breakdown current flows through the discharge lamp 6, and electric charges stored in the capacitor 13 are supplied to the discharge lamp 6 as a current at the time of discharge start.

When the breakdown is detected by a current $I_L$, the FET 5a and the FET 5f are made in the ON state and the FET 5b and the FET 5e are made in the OFF state, and a current continues to be passed in a certain direction by the DC-DC converter 2 (electrode heating period). When the amount of mobile electric charge (integral value of the current $I_L$) reaches 30 mC, the FET 5a and the FET 5f are made in the OFF state and the FET 5b and the FET 5e are made in the ON state, and a current continues to be passed in a reverse direction. Also in this direction, when the amount of electric charge of 30 mC is supplied, an operation proceeds to an AC discharge period. During the AC discharge period, an AC current of 200 Hz to 20 kHz is passed through the discharge lamp 6 and lighting is maintained. The electric power at the time of steady discharge is controlled at 34 W.

The amount of electric charge charged and discharged to the capacitor 13 during the AC discharge period is uselessly consumed due to ON resistance of the FET (loss of electric power). In order to reduce this, the method described in the third embodiment is also used in the tenth embodiment. In the embodiment, the electric charge stored in the capacitor 13 is supplied to the discharge lamp 6 and then the switch is shifted. That is, a dead period of the switch is provided in the ON-OFF shift of the FETs 5a, 5f and the FETs 5b, 5e.

In the tenth embodiment, the number of FETs forming the switching circuit 5 is four equal to the conventional type, but only the voltage of a maximum of 275 V is applied to each the element, so that the FET used in the conventional type can be replaced with a low withstand voltage element. The low withstand voltage element is cheap compared with a high withstand voltage element, so that cost reduction can be achieved.

Incidentally, a type in which the discharge lamp 6 has the igniter circuit 9 is shown in each the embodiment, but the igniter circuit 9 may be eliminated.

As described above, according to a first configuration of the invention, a discharge lamp lighting apparatus comprises electric power regulating means for regulating electric power supplied from a power source and outputting voltages having respective different potentials from two wirings, a switching circuit part formed of one switching element in which input terminals are connected to the two wirings of the electric power regulating means and also one input terminal of the input terminals is connected to one electrode of a discharge lamp and an output terminal is connected to the other electrode of the discharge lamp, and a capacitor connected in series with the discharge lamp in a circuit for making connections of one input terminal of the switching circuit part, the discharge lamp and the output terminal of the switching circuit part, so that one switching element forming the switching circuit part will suffice and thereby, cost reduction and miniaturization can be achieved.

Also, according to a second configuration of the invention, in the first configuration, the discharge lamp is driven with alternating current by repeating a process of supplying a current from the electric power regulating means to the discharge lamp and performing charge to the capacitor and a process of stopping actuation of the electric power regulating means and supplying a reverse directional current from the capacitor to the discharge lamp, so that the discharge lamp can be driven with alternating current even when the number of switching elements forming the switching circuit part is small and thereby, the cost reduction and miniaturization of the discharge lamp lighting apparatus can be achieved.

Also, according to a third configuration of the invention, in the first or second configuration, a standby period for making preparations for lighting, an electrode heating period for detecting at least a voltage $V_C$ of the capacitor to heat the electrodes of the discharge lamp by a discharge lamp current until the voltage $V_C$ reaches a predetermined voltage after the discharge lamp is lighted, and an AC discharge period for passing an AC current through the discharge lamp to sustain discharge are provided, so that a stable discharge emission without lighting failure can be obtained.

Also, according to a fourth configuration of the invention, in one of the first to third configurations, one input terminal of the switching circuit part is connected to the output terminal through the switching element and the other input terminal of the switching circuit part is directly connected to the output terminal, so that one switching element forming the switching circuit part will suffice and thereby, the cost reduction and miniaturization can be achieved.

Also, according to a fifth configuration of the invention, in one of the first to fourth configurations, the switching element comprises means for regulating a control voltage so that a discharge lamp current becomes a predetermined value, so that the maximum discharge current value can be reduced and even in case of using a capacitor with the small capacity value, a voltage drop is small and thereby, the capacitor can also be miniaturized in addition to an increase in stability of lighting.

Also, according to a sixth configuration of the invention, in one of the first to fifth configurations, voltage smoothing and initial current supply means for smoothing a voltage outputted by the electric power regulating means and supplying a current to the discharge lamp at the time of discharge start is provided, so that there is the effect of stably sustaining discharge.

Also, according to a seventh configuration of the invention, in the sixth configuration, a dead period overlaying a period of stopping actuation of the electric power regulating means on an OFF period of the switching element is provided when performing AC drive of the discharge lamp, so that an electric charge stored in the capacitor used as the voltage smoothing and initial current supply means can be usefully utilized for discharge and thereby, reactive power can be reduced.

Also, according to an eighth configuration of the invention, in the sixth configuration, the voltage smoothing and initial current supply means is formed by placing a second capacitor in parallel with a circuit in which a parallel circuit of a resistor and a diode is connected in series with a first capacitor, so that the amount of electric charge necessary for the discharge start can be stored to the first capacitor during the standby period, and charge and discharge to the first capacitor becomes very small due to the high repetitive frequency during the AC discharge period, with the result that a loss of electric power during the AC discharge period can be reduced while ensuring the current necessary at the time of the discharge start.

Also, according to a ninth configuration of the invention, a discharge lamp lighting apparatus comprises electric power regulating means for regulating electric power supplied from a power source and outputting positive and negative binary voltages from two wirings, and a switching circuit part formed of first and second switching elements for controlling connections between the two wirings of the electric power regulating means and one electrode of a discharge lamp, and it is constructed so that the other electrode of the discharge lamp becomes a center voltage level of the positive and negative binary voltages, so that two switching elements forming the switching circuit part will suffice and thereby, the cost reduction and miniaturization can be achieved.

Also, according to a tenth configuration of the invention, in the ninth configuration, a third switching element is placed between one wiring of the two wirings of the electric power regulating means and the switching circuit part, and the third switching element is made in the OFF state during a standby period for making preparations for lighting, so that a voltage applied to the switching elements forming the switching circuit part becomes lower than that of a type without providing the third switching element, with the result that a switching element with low withstand voltage can be used to achieve the cost reduction and miniaturization.

Also, according to an eleventh configuration of the invention, in the ninth configuration, the electric power regulating means has three terminals for outputting a positive voltage, a ground voltage and a negative voltage, and a voltage clamping element is connected between a ground terminal for outputting the ground voltage and a voltage terminal for outputting the positive or negative voltage, so that a voltage applied to the switching elements forming the switching circuit part becomes lower than that of a type without providing the voltage clamping element, with the result that a switching element with low withstand voltage can be used to achieve the cost reduction and miniaturization.

Also, according to a twelfth configuration of the invention, in the eleventh configuration, three voltage levels consisting of the positive voltage, the ground voltage and the negative voltage are formed by using two transformers, so that one voltage can be kept constant while the other voltage can be increased to a predetermined voltage during the standby period.

Also, according to a thirteenth configuration of the invention, in the eleventh configuration, three voltage levels consisting of the positive voltage, the ground voltage and the negative voltage are formed by using an integral transformer in which a primary winding and a secondary winding are placed in one end of a core and another primary winding and a tertiary winding are placed in the other end, so that one voltage can be kept constant while the other voltage can be increased to a predetermined voltage during the standby period.

Also, according to a fourteenth configuration of the invention, a discharge lamp lighting apparatus comprises electric power regulating means for regulating electric power supplied from a power source and outputting voltages having respective different potentials from four wirings, a switching circuit part formed of four switching elements for controlling connections between the two wirings of the four wirings of the electric power regulating means and electrodes of a discharge lamp, and a capacitor which is connected between output terminals of the switching circuit part and supplies a current to the discharge lamp at the time of discharge start, and the residual two wirings of the four wirings of the electric power regulating means are connected to respective electrodes of the capacitor and the four switching elements are made in the OFF state during a standby period for making preparations for lighting, so that the maximum voltage applied to the switching elements can be reduced, with the result that a switching element with a withstand voltage lower than that of a conventional type can be used to achieve the cost reduction.

Also, according to a fifteenth configuration of the invention, in one of the first to fourteenth configurations, the discharge lamp has an igniter circuit, so that there is the effect of stably starting discharge.

What is claimed si:

1. A discharge lamp lighting apparatus comprising:
   electric power regulating means for regulating electric power supplied from a power source, wherein said electric power regulating means has three terminals for respectively outputting a positive voltage, a ground voltage, and a negative voltage at a first wiring, a ground terminal, and a second wiring, respectively;
   a switching circuit including first and second switching elements controlling connection of said first and second wirings to a first electrode of a discharge lamp, the discharge lamp having a second electrode receiving a voltage level intermediate the positive and negative voltages; and
   a third switching element connected in series in one of the first and second wirings of said electric power regulating means and that is connected to said switching circuit, wherein said third switching element is in an OFF state during a standby period preparing for lighting of the discharge lamp.

2. The discharge lamp lighting apparatus as defined in claim 1, wherein said electric power regulating means includes two transformers producing the positive voltage, the ground voltage, and the negative voltage.

3. The discharge lamp lighting apparatus as defined in claim 1, wherein said electric power regulating means includes a single transformer having a first primary winding and a secondary winding at a first end of a core, and a second primary winding and a tertiary winding at a second end of the core for producing the positive voltage, the ground voltage, and the negative voltage.

4. The discharge lamp lighting apparatus as defined in claim 1, including an igniter circuit.

5. A discharge lamp lighting apparatus comprising:

electric power regulating means for regulating electric power supplied from a power source, wherein said electric power regulating means has three terminals for respectively outputting a positive voltage, a ground voltage, and a negative voltage at a first wiring, a ground terminal, and a second wiring, respectively;

a switching circuit including first and second switching elements controlling connection of said first and second wirings to a first electrode of a discharge lamp, the discharge lamp having a second electrode receiving a voltage level intermediate the positive and negative voltages;

a voltage clamping element connected between said ground terminal and one of said first and second switching elements for reducing voltage applied to the one of said first and second switching elements; and a third switching element connected in series in one of the first and second wirings of said electric power regulating means and that is connected to said switching circuit, wherein said third switching element is in an OFF state during a standby period preparing for lighting of the discharge lamp.

6. The discharge lamp lighting apparatus as defined in claim 5, wherein said electric power regulating means includes two transformers producing the positive voltage, the ground voltage, and the negative voltage.

7. The discharge lamp lighting apparatus as defined in claim 5, wherein said electric power regulating means includes a single transformer having a first primary winding and a secondary winding at a first end of a core, and a second primary winding and a tertiary winding at a second end of the core for producing the positive voltage, the ground voltage, and the negative voltage.

8. The discharge lamp lighting apparatus as defined in claim 5, including an igniter circuit.

* * * * *